Figure 1:
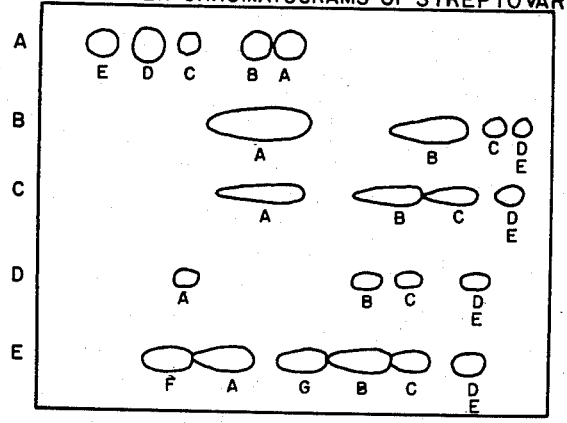

Dec. 31, 1963   A. DIETZ ETAL   3,116,202
ANTIBIOTIC STREPTOVARICIN AND PROCESS FOR ITS PRODUCTION
Filed July 23, 1956   10 Sheets-Sheet 1

PAPER CHROMATOGRAMS OF STREPTOVARICIN

CRAIG FRACTIONS

PAPER CHROMATOGRAMS OF CRAIG FRACTIONS

A. DIETZ
C. DE BOER
R. M. SMITH
P. SIMINOFF
G. A. BOYACK
G. B. WHITFIELD, Jr.
INVENTORS
BY
ATTORNEYS

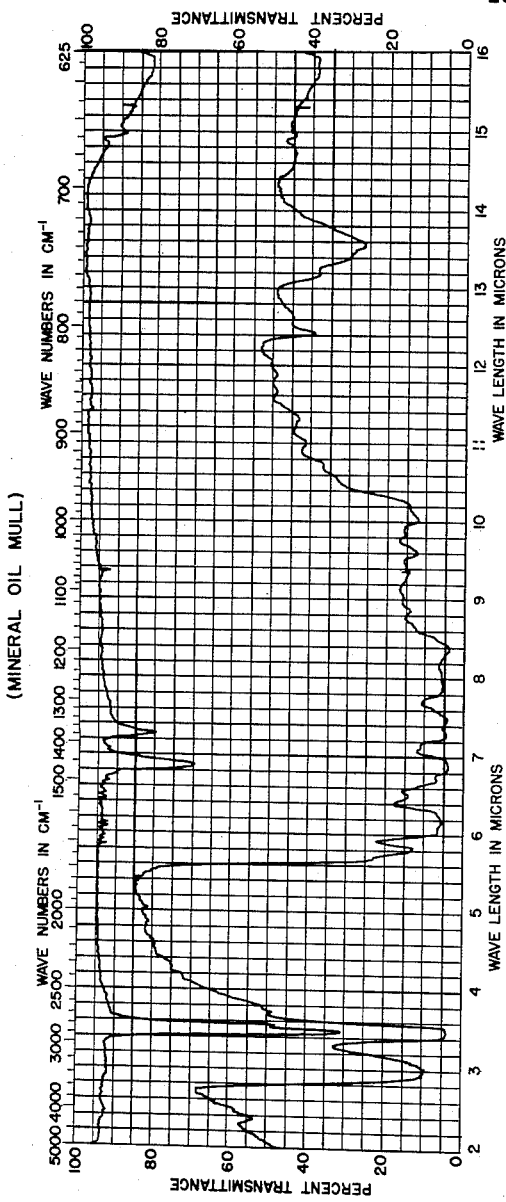

INFRARED ABSORPTION SPECTRUM — STREPTOVARICIN B
(MINERAL OIL MULL)

INFRARED ABSORPTION SPECTRUM—STREPTOVARICIN A
(MINERAL OIL MULL)

A. DIETZ
C. DE BOER
R. M. SMITH
P. SIMINOFF
G. A. BOYACK
G. B. WHITFIELD, Jr.
INVENTORS

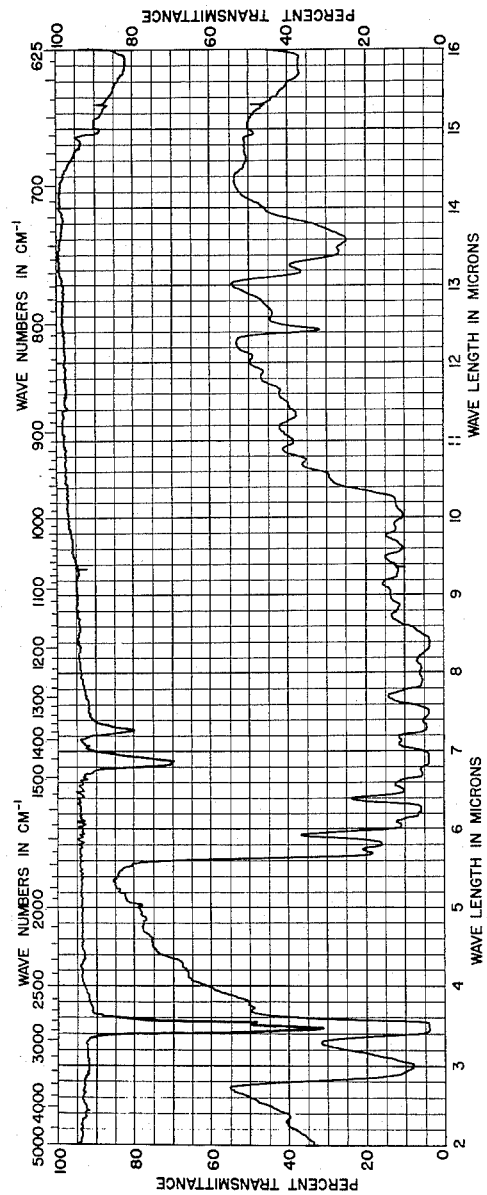

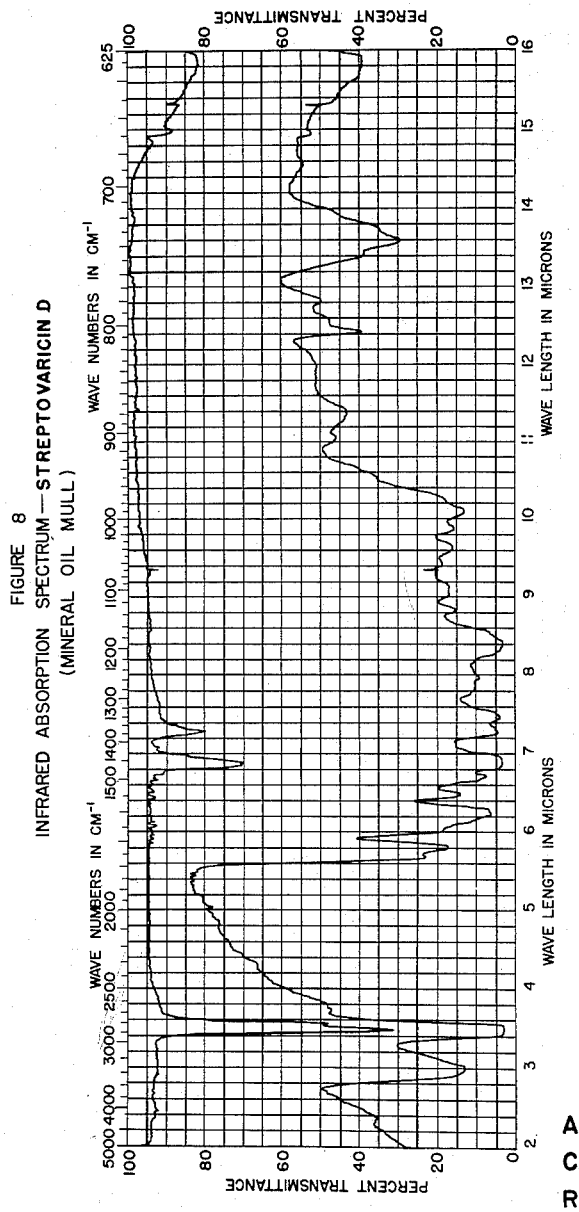

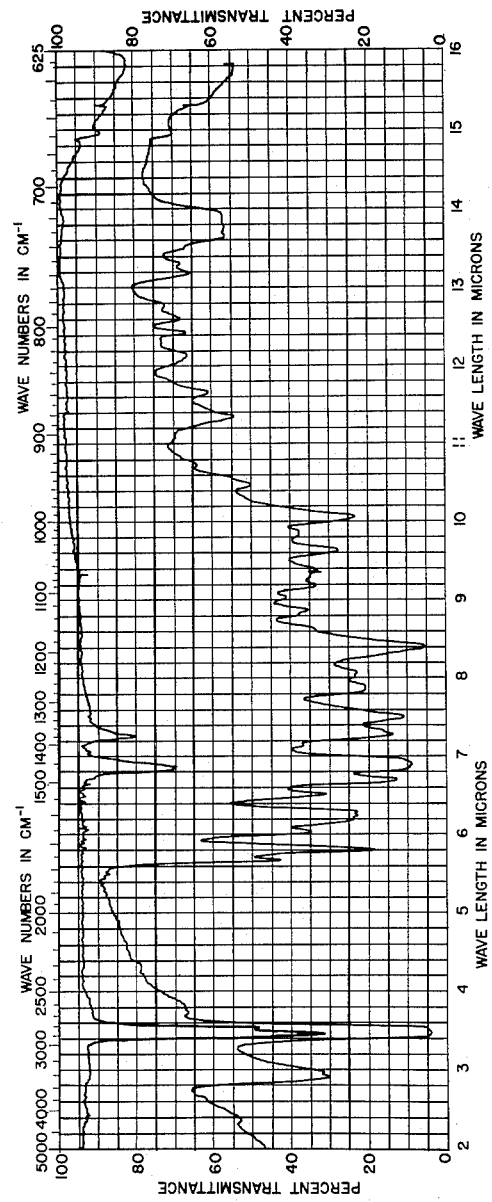

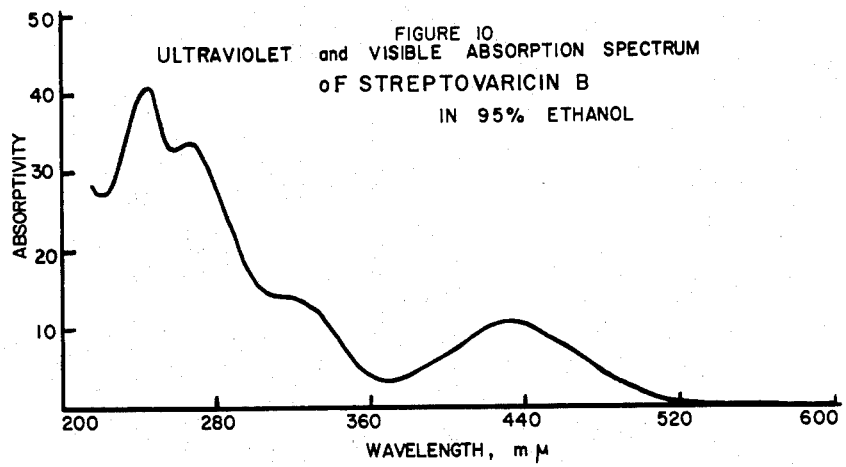
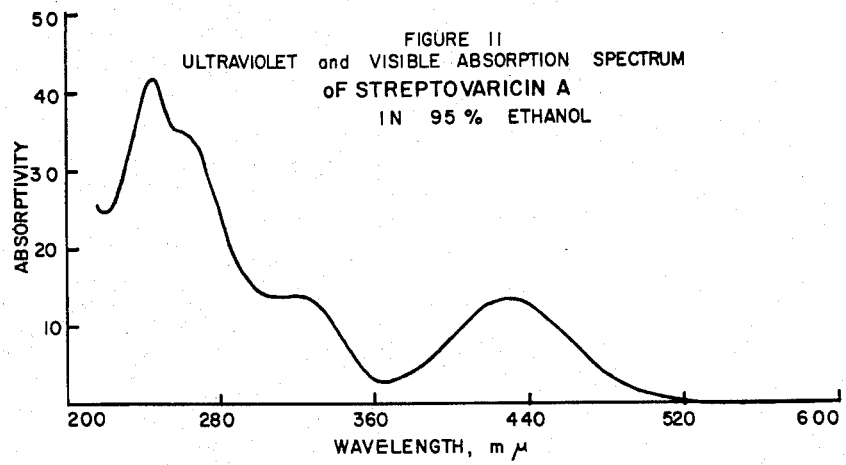

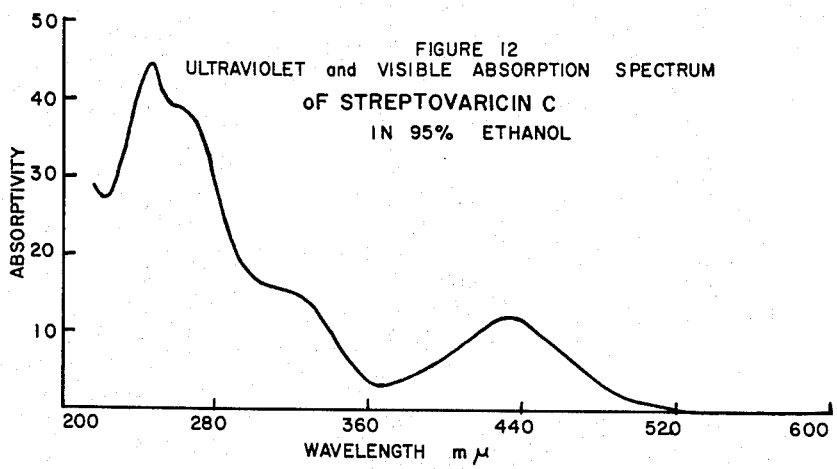
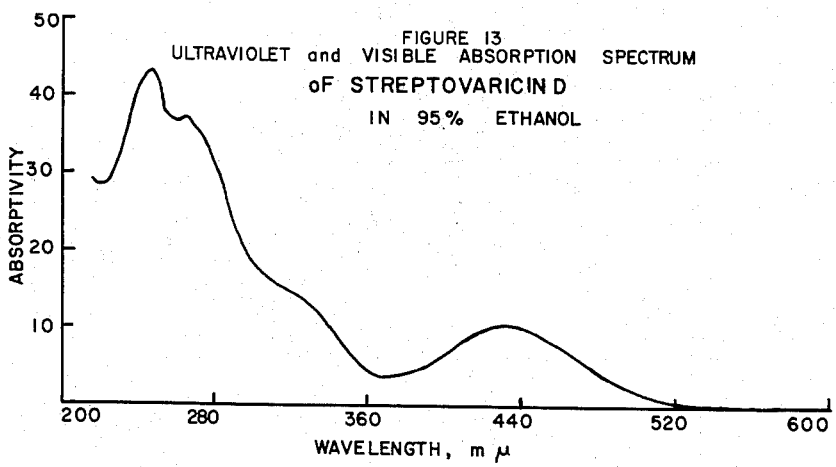

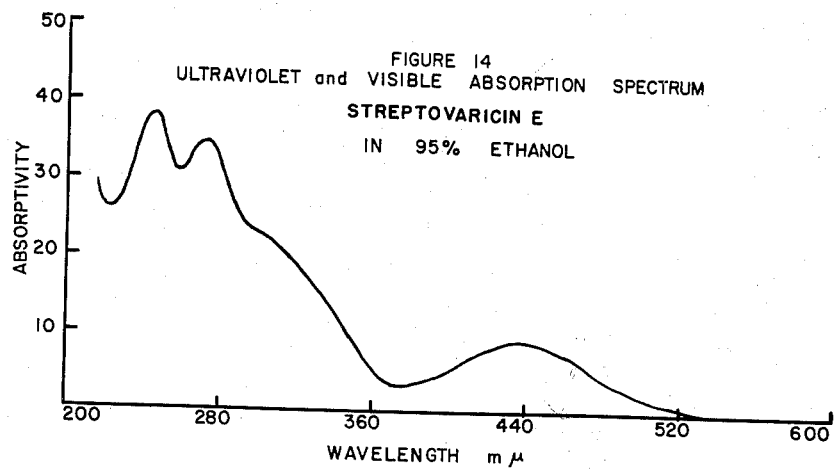
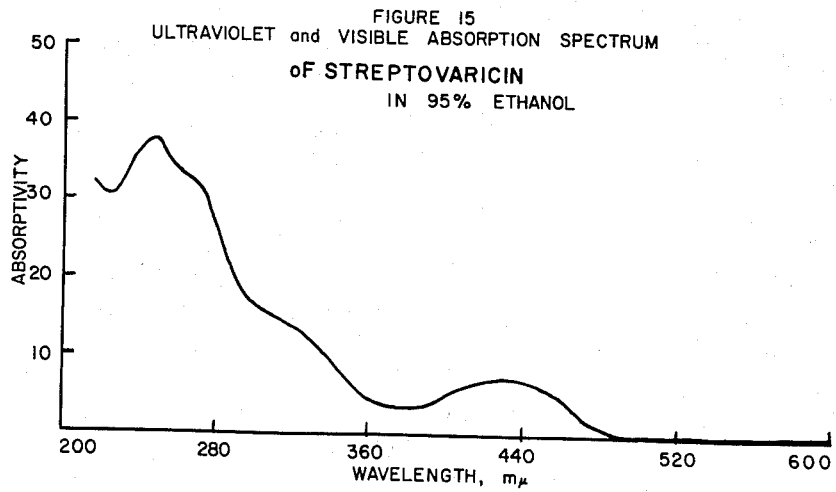

3,116,202
ANTIBIOTIC STREPTOVARICIN AND PROCESS FOR ITS PRODUCTION

Alma Dietz, Kalamazoo, Clarence De Boer, Kalamazoo Township, Kalamazoo County, Robert M. Smith, Portage Township, Kalamazoo County, and Paul Siminoff, Gerald A. Boyack, and George B. Whitfield, Jr., Kalamazoo, Mich., assignors to The Upjohn Company, Kalamazoo, Mich., a corporation of Michigan
Filed July 23, 1956, Ser. No. 599,401
23 Claims. (Cl. 167—65)

This invention relates to new compounds and to a process for their preparation and has for its objects a new antibiotic, referred to herein as streptovaricin, and a process for its production.

The new antibiotic of this invention can be produced in a fermentation process in which *Streptomyces spectabilis* is cultivated in an aqueous nutrient medium and recovered therefrom after substantial antibiotic activity is imparted thereto.

*Steptomyces spectabilis* is a new species which was isolated from a soil sample taken in Dallas, Texas. A culture of the living organism has been deposited with the Fermentation Division, Northern Utilization Research Branch, U.S. Department of Agriculture, Peoria, Illinois, and has been added to its permanent collection as NRRL 2494. This new microorganism is distinctly characterized by the development of pigment granules in both the vegetative and aerial mycelium. Only two other species, *Streptomyces fulvissimus* and *Streptomyces rubrireticuli*, have been observed to develop pigment granules. Both of these species, however, produce antibiotics that are distinctly different from streptovaricin. The first species produces valinomycin which is distinguished from streptovaricin by its colorless crystals. Streptovaricin crystals are characteristically colored. The other produces streptin and hydroxystreptomycin (reticulin) both of which are distinguished from streptovaricin by their insolubility in acetone, chloroform, and ether. Further characterization of the new species and various strains or variants thereof, all of which produce streptovaricin, will be given hereinafter.

Streptovaricin can be produced by cultivating *Streptomyces spectabilis* in an aqueous nutrient medium under submerged aerobic conditions and preferably, in a nutrient medium containing both an assimilable carbohydrate and a nitrogen compound. Although there are a number of suitable media available, for economy of production, maximum yield of antibiotic material and ease of isolation thereof, certain culture media are preferred. The presently preferred sources of carbohydrates are glucose, dextrin, molasses, and starch, including combinations thereof. Other suitable sources are maltose, galactose, mannitol, soybean oil, and the like. The preferred sources of nitrogen are soybean meal, fish meal, cotton seed meal, Kay Soy (finely powdered, defatted soybean meal), and the like. Other suitable sources are peanut meal, brewer's yeast (dried yeast cells obtained from a beer fermentation), corn gluten meal, corn steep liquor, and the like.

Nutrient inorganic salts, for example, salts capable of yielding ions such as potassium, sodium, calcium, phosphate, sulfate, and the like, can be advantageously incorporated in the medium. Essential trace elements such as magnesium, manganese, zinc, iron, and the like, can also be included in the culture medium for growing *Streptomyces spectabilis*. Such trace elements are commonly supplied as impurities incidental to the addition of the constituents of the medium.

The media used in the process of the invention can contain precursors, in addition to the nutrient components present therein, to obtain valuable products. For example, an assimilable source of cobalt can be included where cobalamines (vitamin $B_{12}$ and vitamin $B_{12}$-like products) are desired, and these byproducts then recovered by conventional methods. Similarly, steroid precursors, such as progesterone or Reichstein's Compound S or S acetate, can be added to obtain a steroid oxidized in the 11-position.

For maximum growth and development of *Streptomyces spectabilis*, the culture medium, prior to inoculation of the microorganism, should be adjusted to a pH between about 6.5 and about 7.5.

Submerged, aerobic culture conditions are the conditions of choice for the production of large amounts of streptovaricin. For the preparation of limited amounts of the antibiotic, shaken flasks and surface cultures in bottles can be employed. When growth is carried out in large vessels and tanks, it is preferable to use the vegetative form of the microorganism for inoculation to avoid a pronounced lag in the production of the antibiotic and the attendant inefficient utilization of the equipment. Accordingly, it is desirable first to produce a vegetative inoculum of the microorganism by inoculating a relatively small amount of culture medium with material scraped from a nutrient agar slant of the microorganism, and when a young, active, vegetative inoculum has been secured, to transfer the vegetative inoculum aseptically to large vessels or tanks. The medium in which the vegetative inoculum is produced can be the same as, or different from, that utilized for the production of the antibiotic.

Optimum yields of streptovaricin are obtained when the culture medium is maintained at a temperature between about 24 and about 37 degrees centigrade, and preferably between about 28 and about 34 degrees centigrade, for a period between about two and about six days.

The process of the invention is not to be limited to the production of streptovaricin by *Streptomyces spectabilis*. It is to be understood that the fermentative processes of this invention also embrace other streptovaricin-producing strains or variants such as, for example, are readily produced and isolated by routinely applied isolation and/or strain modification methods which include selection of cultured microorganisms and exposure of these microorganisms to modification by physical methods such as X-ray and ultraviolet light, and mutagenic chemical agents such as nitrogen mustards and colchicine.

The rate of production of streptovaricin and the concentration of the antibiotic in the culture medium are readily followed during the growth period of the microorganism by testing samples of the culture medium for antibiotic activity against an organism known to be susceptible to the antibiotic, e.g., *Mycobacterium ranae* or *Micrococcus pyogenes* variety *aureus*, by standard agar diffusion or turbidimetric test procedures. In general, maximum production of the antibiotic, after inoculation of the culture medium, occurs between about two and about six days when submerged aerobic cultures are employed.

The antibiotic material can be recovered from the culture medium by extractive or adsorptive techniques including adsorption of the antibiotic on carbon and elution therefrom with suitable eluting agents. Solvent extraction procedures are preferred for commercial production inasmuch as they are less time consuming and expensive and higher recovery yields are obtained thereby.

A preferred extractive procedure for recovering the antibiotic activity from the fermented nutrient medium comprises filtering the beer at a pH between about 4.0 and about 8.0 and then extracting with a water-immiscible organic solvent such as a lower-alkyl acetate, e.g., amyl acetate, ethyl acetate, n-propyl and isopropyl acetate, and n-butyl and isobutyl acetate; lower-aliphatic ketones such as methyl ethyl ketone, methyl isobutyl ketone, and methyl isopropyl ketone; halogenated aliphatic hydrocarbons such as methylene chloride, ethylene dichloride, carbon tetrachloride, and chloroform; hydrocarbons such as benzene, toluene, cyclohexane, and methyl cyclohexane; ethyl acetate and methylene chloride being especially preferred. The hydrocarbon solvents, more selective for the less polar components, e.g., streptovaricin D and streptovaricin E can be advantageously used in combination with one or more non-hydrocarbon solvents.

The solvent extract is then concentrated and dried to obtain the antibiotic material. When the antibiotic material thus obtained is dissolved in a suitable solvent such as cyclohexane, benzene, methyl cyclohexane, toluene, ethyl acetate, and the like, followed by the addition of technical n-hexane (petroleum ether consisting essentially of n-hexane sold under the name "Skellysolve B"), the antiobiotic material is obtained in the form of yellow crystals.

Streptovaricin is a complex of closely related components, each of which possesses antibiotic activity. Five components, streptovaricin B, streptovaricin A, streptovaricin C, streptovaricin D, and streptovaricin E are found in most beers. Additional components streptovaricin F and streptovaricin G have been observed in some beers. Also streptovaricin A, a highly acylated component, has been converted by treatment with an acetylating catalyst and by treatment with ammonia to the other components as shown in Examples 10, 11, and 12. FIGURE 1A is a papergram developed in a phosphate buffer solvent system of a typical beer produced according to Example 1 showing components streptovaricin B, streptovaricin A, streptovaricin C, streptovaricin D, and streptovaricin E. FIGURES 1B and 1C are papergrams developed in the Bush B5 solvent system (benzene-methanol-water in a volume ratio of 2:1:1) of the same beer showing separation of components streptovaricin B, streptovaricin A, streptovaricin C, and a mixture of streptovaricin D and streptovaricin E. FIGURE D is a quantitative papergram developed in a modified Bush B5 system (benzene-methanol-water in a volume ratio of 1:1:2 developed at room temperature) showing the same five components. FIGURE 1E is a papergram developed in the Bush B5 solvent system of another beer produced according to Example 1 showing the presence of seven components. From these and other papergram analyses the Rƒ values, i.e., the ratio of the distance travelled by the component to that travelled by the solvent, for the seven components have been determined as follows.

TABLE I

| Component: | Rƒ |
|---|---|
| Streptovaricin B | 0.65 |
| Streptovaricin A | 0.35 |
| Streptovaricin C | 0.75 |
| Streptovaricin D and streptovaricin E | 0.85 |
| Streptovaricin F | 0.25 |
| Streptovaricin G | 0.55 |

The close relation in the chemical and physical properties of the components of streptovaricin is shown by the fact that they are not resolved in the usual solvent systems. As shown by the papergram analyses in the following table, all components move at the same rate in the several solvent systems listed.

TABLE II

| Solvent system | Rƒ |
|---|---|
| 81% n-butanol | 0.9 |
| 81% n-butanol, 0.25% p-toluenesulfonic acid | 0.9 |
| n-butanol-acetic acid-water (2:1:1) | 0.9 |
| 81% n-butanol, 2% piperidine | 0.9 |
| 96% water, 4% n-butanol | 0.85 |
| 96% water, 4% n-butanol, 0.25% p-toluenesulfonic acid | 0.9 |
| 0.1 N NH$_4$OH saturated with methyl isobutyl ketone | 0.8 |

Preparations of crystalline streptovaricin have exhibited melting or decomposition points between about 155 degrees centigrade and about 255 degrees centigrade; optical rotations $[\alpha]_D^{24}$=between about 301 and about 425 degrees (c., 0.3 in absolute ethanol); using a Beckman quartz spectrophotometer Model DU, or a Cary recording spectrophotometer, ultraviolet absorption maxima (in a 95% neutral ethanol solution) at 435 m$\mu$ and 245 m$\mu$, as shown in FIGURE 15; and the following elemental analysis:

Calcd. for $C_{34}H_{47-9}NO_{13}$: C, 60.20; H, 7.08; N, 2.07. Found: C, 63.64; H, 6.89; N, 1.68.

Streptovaricin is soluble in alcohols such as methanol, ethanol, propanol, butanol, amyl alcohol, including isomeric forms thereof, dodecyl alcohol, undecyl alcohol, decyl alcohol, nonyl alcohol, heptyl alcohol, hexyl alcohol, including isomeric forms thereof; lower-alkyl acetates such as amyl acetate, ethyl acetate, and the like; lower-alkyl ketones such as methyl ethyl ketone, methyl isobutyl ketone, methyl isopropyl ketone, and the like; chlorinated aliphatic hydrocarbons such as methylene chloride, ethylene dichloride, chloroform, and the like; dioxane, dimethylacetamide, dimethylformamide (>5 mgs./ml.); it is slightly soluble in carbon tetrachloride; toluene (5 mgs./ml.); ethers such as ethyl ether, butyl ether, propyl ether, including isomeric forms thereof, and the like; technical n-hexane; water (<1 mg./ml.), and the like.

Streptovaricin is stable at room temperature for three to four days at a pH range of about 2.0 to about 6.0; and at eighty degrees centigrade it is stable for one hour at a pH of 2.0. The antibiotic material is unstable in alkali; there is a gradual loss in activity while standing at room temperature at a pH of 7.8 for a period of two to three days.

The infrared absorption spectrum (sodium chloride prism) of streptovaricin in a mineral oil suspension, FIGURE 2, exhibits characteristic absorption bands (expressed in reciprocal centimeters) at the following frequencies:

3380, 1760 1715, 1650 1615 1585, 1537, 1510 1490, 1458, 1402, 1374, 1336, 1262 1240, 1194, 1124, 1104, 1062. 1035, 1010, 987, 925, 875, 797, 735.

Streptovaricin is a neutral or weakly acidic material. It will hydrolyze on treatment with dilute alkali. On reacting an ethanolic solution of this material with an aqueous solution of methyl orange, the helianthate of the complex is obtained; on reaction with acylating agents, the corresponding acyl derivatives are obtained, illustratively, the acetyl and benzoyl derivatives.

Streptovaricin is characterized by activity against the following organisms.

TABLE III

*Antimicrobial Spectrum—Streptovaricin—Minimal Inhibitory Concentration, Mcg./Ml.*

| Test organism: | Streptovaricin [1] |
|---|---|
| Mycobacterium tuberculosis H37Rv | 0.16. |
| Mycobacterium tuberculosis BCG | 0.16. |
| Mycobacterium ranae | 0.78. |
| Micrococcus pyogenes v. aureus | 0.39. |
| Micrococcus pyogenes v. albus | 0.39. |
| Streptococcus hemolyticus | 3.12. |
| Streptococcus viridans | 25. |
| Bacillus subtilis | 0.39. |
| Diplococcus pneumoniae | 6.25. |
| Klebsiella pneumoniae | 3.12. |
| Pseudomonas aeruginosa | 12.5. |
| Salmonella typhosa | 25. |
| Salmonella paratyphi | >100. |
| Pasteurella multocida | 1.56. |
| Escherichia coli | 25. |
| Proteus vulgaris | 100. |
| Nocardia asteroides | 1000 (partial at 100). |
| Blastomyces dermatitidis | >1000. |
| Coccidioides immitis | >1000. |
| Geotrichum sp. | 1000. |
| Hormodendrum compactum | 1000 (partial inhibition). |
| Phialophora verrucosa | 1000 (partial inhibition). |
| Cryptococcus neoformans | 1000. |
| Sporotrichum schenckii | 1000 (partial inhibition). |
| Monosporium apiospermum | 1000 (partial inhibition). |
| Trichophyton rubrum | 1000. |
| Microsporum audouini | 1000. |
| Candida albicans Ab | >1000. |
| Candida albicans Up | >1000. |
| Microsporum canis | 1000. |
| Trichophyton interdigitale | >1000. |
| Trichophyton violaceum | 1000. |

[1] Streptovaricin B, 370 mcg./ml.; streptovaricin A, 125 mcg./ml.; streptovaricin C, 430 mcg./ml.; streptovaricin D and streptovaricin E, ca. 20 mcg./ml., each.

The components of streptovaricin can be separated by partition chromatography or countercurrent extraction. Several solvent systems have been found to give good resolution in paper strip chromatography as shown in FIGURES 1A, 1B, 1C, 1D, and 1E. Paper chromatograms in the same solvent systems obtained from isolated streptovaricin show the same seven components. Another solvent system giving the same type of separation as the Bush B5 system is chloroform saturated with water; still another is cyclohexane:chloroform:water in a volume ratio of 1:8:2. In the latter system, strips buffered at pH 4.1, equilibrated for two hours in the aqueous phase, and developed about four hours in the non-aqueous phase, show $R_f$ values as follows.

TABLE IV

| Component: | $R_f$ |
|---|---|
| Streptovaricin B | 0.37 |
| Streptovaricin A | 0.13 |
| Streptovaricin C | 0.77 |
| Streptovaricin D and E | 0.88 |

The same or similar solvent systems can be used effectively in columns to effect separation of the components. By using a partition chromatographic column, good separation of all components except 4 and 5 is obtained. Using a column packed with diatomaceous earth, good separation was obtained with the Bush B2 solvent system [toluene-technical n-hexane-methanol and water in a volume ratio of 67:33:60:40]. A charge of streptovaricin isolate containing components streptovaricin B, streptovaricin A, streptovaricin C, streptovaricin D, streptovaricin E was placed on the top of a column of diatomaceous earth containing the stationary (lower) phase of the solvent system and then eluted with the mobile (upper) phase of the solvent system. The charge of streptovaricin isolate is prepared by dissolving the isolate in the stationary phase and mixing the resulting solution with diatomaceous earth in the proportion of two grams per milliliter. The two phases of the solvent system are obtained simply by letting the solvent system separate into the two phases. The column is packed in the proportion of two grams of diatomaceous earth to one milliliter of the stationary or lower phase. On elution with the mobile phase, components streptovaricin D and streptovaricin E come off together first, then components streptovaricin C, streptovaricin B, and streptovaricin A in the order named. Component streptovaricin A moves very slowly and sometimes is advantageously washed out of the column with methylene chloride or like solvent after the other component fractions have been recovered.

Figure 3:
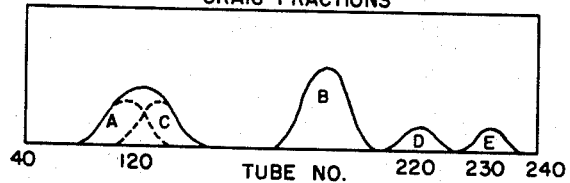

The complex can also be partially resolved using the standard Craig countercurrent procedure. FIGURE 3 illustrates the distribution of the five components in the Craig fractions obtained with a water-ethanol-cyclohexane-ethylacetate (1:1:1:1 by volume) solvent system. It will be observed that a clear separation is obtained of components streptovaricin B, streptovaricin D, and streptovaricin E but that components streptovaricin A and streptovaricin C are not separated.

By combining a partition column separation with a Craig separation, all five components are separated. Thus the mixture of components streptovaricin D and streptovaricin E obtained with the partition column can be separated by the Craig procedure or the mixture of components streptovaricin A and streptovaricin C obtained by the Craig procedure can be separated with the partition column.

Figure 4:
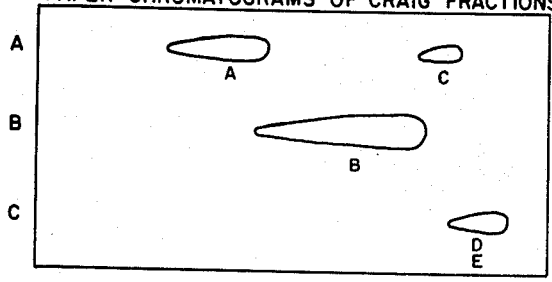

FIGURE 4 illustrates the movement of the components of the Craig fractions on a paper strip using the Bush B5 system. Chromatogram A shows that the first Craig fraction contains only streptovaricin A and streptovaricin C. Chromatogram B shows that the second Craig fraction contained only streptovaricin B. Chromatogram C illustrates the result obtained with the third and fourth Craig fraction. Since both streptovaricin D and streptovaricin E have the same $R_f$ in the Bush B5 system, one chromatogram serves to illustrate both fractions.

A typical quantitative distribution of the components is given in Table V. The culture medium (1850 ml.) was filtered and the clear liquid extracted with ethyl acetate.

TABLE V

*Quantitative Distribution of the Components of Streptovaricin*

| Stage | Amount of Component in mcg./ml. or mcg./mg. | | | |
|---|---|---|---|---|
| | Streptovaricin B | Streptovaricin A | Streptovaricin C | Streptovaricin D and/or Streptovaricin E |
| Filtered beer | 48 | 28 | 85 | 70 |
| Spent cake [1] | 12 | <10 | 41 | 224 |
| Spent beer | 0 | <10 | trace | 0 |
| Extract solids [2] | 110 | 82 | 255 | 254 |
| Supernatant [2] | 84 | <12 | 237 | 546 |

[1] Ten grams of this cake was slurried in 20 milliliters of acetone and filtered and the acetone filtrate assayed.
[2] The ethyl acetate extract was treated with five volumes of technical n-hexane and filtered.

The principal components of streptovaricin have the following physical characteristics:

TABLE VI

*Analysis*

| Component | Percent C | Percent H | Percent N | Percent Acyl |
|---|---|---|---|---|
| Streptovaricin B | 58.84 | 7.22 | 1.70 | 11.75 |
| Streptovaricin A | 59.72 | 6.57 | 1.87 | 18.17 |
| Streptovaricin C | 59.07 | 6.99 | 2.03 | 9.84 |
| Streptovaricin D | 60.86 | 7.85 | 2.14 | 5.91 |
| Streptovaricin E | 63.11 | 7.16 | 1.92 | 6.13 |

TABLE VII

| Component | Specific Rotation | | Melting Point, degrees |
|---|---|---|---|
| | $[\alpha]_D^{24}$, degrees | Solvent | |
| Streptovaricin B | +454 | $CHCl_3$ | 182–184 |
| Streptovaricin A | +618 | $CHCl_3$ | 195–200 |
| Streptovaricin C | +317 | $CHCl_3$ | 168–171 |
| Streptovaricin D | +102 | $CHCl_3$ | 115–118 |
| Streptovaricin E | +164 | $CHCl_3$ | 102–105 | and the following antimicrobial spectrum.

TABLE VIII

*Antimicrobial Spectrum—Streptovaricin and Components—Minimal Inhibitory Concentration, Mcg./Ml.*

| Test Organism | Streptovaricin | Streptovaricin B | Streptovaricin A | Streptovaricin C | Streptovaricin D | Streptovaricin E |
|---|---|---|---|---|---|---|
| *Mycobacterium tuberculosis* H37Rv | 0.16 | 0.26 | 0.08 | 0.31 | | |
| *Mycobacterium tuberculosis* BCG | 0.16 | 0.31 | 0.16 | 0.31 | 3.12 | 6.25 |
| *Mycobacterium ranae* | 0.78 | 0.78 | 0.39 | | | |
| *Micrococcus pyogenes v. aureus* | 0.39 | 0.39 | 0.39 | 3.12 | 12.5 | 6.25 |
| *Micrococcus pyogenes v. albus* | 0.39 | 0.2 | 0.2 | 0.78 | 6.25 | 6.25 |
| *Streptococcus hemolyticus* | 25 | 25 | 3.12 | 100 | 25 | 12.5 |
| *Streptococcus viridans* | 3.12 | 3.12 | 3.12 | 12.5 | >100 | >100 |
| *Bacillus subtilis* | 0.39 | 0.2 | 0.39 | 0.78 | 0.39 | 1.56 |
| *Diplococcus pneumoniae* | 6.25 | 12.5 | 1.56 | 100 | 50 | 1.56 |
| *Klebsiella pneumoniae* | 3.12 | 3.12 | 3.12 | 6.25 | >100 | >100 |
| *Pseudomonas aeruginosa* | 12.5 | 12.5 | 12.5 | 25 | >100 | >100 |
| *Salmonella typhosa* | 25 | 25 | 12.5 | 25 | >100 | >100 |
| *Salmonella paratyphi* | >100 | >100 | >100 | >100 | >100 | >100 |
| *Pasteurella multocida* | 1.56 | 1.56 | 0.78 | 1.56 | >50 | 50 |
| *Escherichia coli* | 25 | 12.5 | 25 | 25 | >100 | >100 |
| *Proteus vulgaris* | 100 | 100 | 25 | >100 | >100 | >100 |

Component streptovaricin A was prepared according to Example 9; the other components according to Examples 13 and 14. Component streptovaricin A was recrystallized from acetone; the others from aqueous acetone (four volumes acetone to one volume of water). The components recrystallized as indicated have the infrared absorption spectra (in mineral oil mull) shown in FIGURES 5, 6, 7, 8, and 9, respectively, and the following characteristic absorption maxima.

TABLE IX

*Infrared Absorption Maxima*

Streptovaricin B:

3400, 1758, 1715, 1652 1642 1602 1584,
1540 1522, 1492, 1455, 1405, 1374, 1335,
1265, 1240, 1195 1189, 1155, 1115, 1069,
1035, 1012, 988, 925, 875, 850, 835, 797,
750 740 725, 680

Streptovaricin A:

3480 3310, 1740 1720 1706, 1631, 1598 1585,
1550 1536, 1510, 1459 1437, 1406, 1375 1365,
1338, 1290 1281, 1252, 1198 1175, 1149,
1120 1105, 1085 1070, 1037 1026 1015, 1096,
972, 942 935, 916, 900, 875, 830, 800,
750 740 730 722, 685

Streptovaricin C:

3410, 1756 1720, 1651, 1615 1590, 1535,
1510 1490, 1455, 1405, 1372, 1335, 1265,
1239, 1192, 1124, 1100, 1068, 1035, 1010,
990 975, 940, 924, 905, 877 855, 798 782,
750 737 726

Streptovaricin D:

3420, 1760 1718, 1655 1602 1589, 1542, 1498,
1455, 1405, 1375 1365, 1339, 1275 1255, 1192,
1130, 1100 1089, 1060, 1035, 1008, 986 974,
900, 874, 825, 799 790 773, 740 730 710, 677

Streptovaricin E:

3530 3480 3420, 1760, 1720, 1655, 1600,
1535, 1496, 1450, 1405, 1375 1364, 1332,
1276 1267, 1248 1240, 1193, 1155, 1124,
1102, 1085 1072 1062, 1034, 1011, 990,
950, 925, 876, 852, 817, 798, 786 775,
752 745, 723 712 and the ultraviolet absorption spectra (in 95 percent ethanol) shown in FIGURES 10, 11, 12, 13, and 14, respectively, with the following characteristic absorption maxima and extinction coefficients.

TABLE X

*Ultraviolet and Visible Absorption Maxima*

| Component | λ max | a[1] |
|---|---|---|
| Streptovaricin B | 245 | 40.83 |
|  | 266 | 33.85 |
|  | 320 | 14.01 |
|  | 432 | 10.97 |
| Streptovaricin A | 245 | 41.89 |
|  | 260 | 35.21 |
|  | 320 | 13.98 |
|  | 430 | 13.62 |
| Streptovaricin C | 245.5 | 44.35 |
|  | 260 | 38.97 |
|  | 320 | 15.31 |
|  | 430 | 12.19 |
| Streptovaricin D | 246 | 43.14 |
|  | 264 | 37.03 |
|  | 320 | 14.77 |
|  | 433 | 10.53 |
| Streptovaricin E | 245 | 38.22 |
|  | 273 | 34.69 |
|  | 320 | 19.04 |
|  | 437 | 9.19 |

[1] $10a = E_{1\ cm}^{1\%}$.

These data were obtained from acetone solutions; 100 percent acetone in the case of streptovaricin A and 80 percent acetone plus 20 percent water in the others.

The components give positive $FeCl_3$ and iodoform tests.

Streptovaricin, including the components thereof and derivatives, are useful in combatting many diseases caused by microbial infections in animals but has not yet been proved effective in man. For this use, the antibiotic can be used alone or with a pharmaceutically acceptable carrier which can be in the form of a solid material, powder, or a liquid. The compositions can take the form of compressed tablets, effervescent tablets, powder, granules, capsules (both hard and soft gelatin capsules), aqueous solution suspensions in edible oils, aqueous suspensions, or other dosage forms which are particularly useful for oral administration. Sterile liquid preparations or formulations are employed for parenteral use. Such a medium can be a sterile solvent or a sterile suspending vehicle containing an injectable oil, or water-containing hydrophilic colloids such as sodium carboxymethyl cellulose, methyl cellulose, polyvinyl pyrrolidone, gelatin, tragacanth, and the like. The compositions can take the form of active material, namely, the antibiotic material, admixed with solid diluents and/or tableting adjuvants such as corn starch, lactose, talc, stearic acid, magnesium stearate, gums, and the like. Any of the encapsulating or tableting materials used in pharmaceutical practice can be employed where there is no incompatability with the antibiotic. The material can be tableted with or without adjuvants. Alternatively, the antibiotic can be placed in the usual or resorbable material such as the usual gelatin capsule and administered in that form. In yet another embodiment, the antibiotic can be put up in powder packets and so employed.

Streptovaricin, including the components thereof and derivatives, can be prepared in the form of a palatable suspension in a suitable fixed oil, for example, coconut oil, peanut oil, and the like, containing about two percent aluminum monostearate as the suspending agent. Such a suspension can be given orally as made or can be encapsulated. The antibiotic material can be used topically in petrolatum-type grease bases, water-soluble ointment bases such as Carbowaxes (solid polyethylene glycols of molecular weight of about 1500 including mixtures of polyethylene glycols of higher and lower molecular weights) to give a product of ointment-like consistency, creams, water-in-oil or oil-in-water emulsions and lotions; useful topical therapy is made of nosedrops, sprays, troches and suppositories. For veterinary use, the preparations are essentially useful in the form of bougies, capsules, tablets, mastitis ointments, oil suspensions, and the like.

Because of its marked antibacterial activity and low toxicity as well as resulting high blood levels, streptovaricin and its derivatives are useful as therapeutic agents in the treatment of various diseases. For example, because of its unusually high activity against *M. tuberculosis* H37Rv, the antibiotic material is useful in the treatment of tuberculosis. In the treatment of tuberculosis, advantageous results are obtained by combining streptovaricin with other anti-tubercular medicinals such as isonicotinic acid hydrazide, streptomycin and/or dihydrostreptomycin, p-amino-salicylic acid and salts thereof, D-4-amino-3-isoxazolidone (Cycloserine), a combination of isonicotinic acid hydrazide and p-amino-salicylic acid and salts thereof, a combination of streptomycin, isonicotinic acid hydrazide and p-amino-salicyclic acid and the salts thereof, and the like.

The antibiotic material of the invention is also useful as an environmental anti-tuberculosis agent, e.g., in hospital and dairy sanitation. For this purpose, it is incorporated in the usual carriers, e.g., aerosols and detergent solutions, alone or in combination with sulfa compounds such as sulfadiazine, sulfamerazine, and sulfamethazine (in the ratio of about one part of the antibiotic to two parts of total sulfa), or antibiotics such as tetracycline, oxytetracycline, chlortetracycline, neomycin, polymyxin, chloramphenicol, penicillins G, O, and V, novobiocin, bacitracing, streptothricin, circulin, and erythromycin. The antibiotic material or combinations thereof with the aforementioned therapeutics, are also useful in the treatment of staphylococcal and pneumococcal pulmonary and respiratory infections. Administration can be by the topical, oral, or parenteral route. The antibiotic is likewise useful in combination with various vitamins such as thiamine, riboflavin, ascorbic acid, niacinamide, pyridoxine, pantothenic acid, vitamin $B_{12}$, and folic acid. Other therapeutically useful materials can also be combined with the antibiotic. In combination with various corticoids, the therapeutic activity of streptovaricin and its components and derivatives is enhanced in the treatment of atopic and contact dermatitis, neurodermatitis, pruritis, and the like. Suitable corticoids include cortisone, hydrocortisone, and esters thereof; $\Delta^1$-cortisone and $\Delta^1$-hydrocortisone including esters of these compounds in the 21-position, e.g., acetate, cyclopentylpropionate, and succinate, including its water-soluble salts; alkyl-substituted cortisones and hydrocortisones such as 2-methyl hydrocortisone, and 6-methylhydrocortisone, including esters thereof.

The antibiotic agents of the invention can be used in animals such as poultry and cows. For such use, they can take the form of animal feed compositions such as poultry feed compositions containing at least 0.1 percent of the agent and a significant amount of nutritive material.

When administered, for example, parenterally, the antibiotic is also useful in the treatment of an infection in animals caused by *Pasteurella multocida*, the causative microorganism of hemorrhagic septicemia, a shipping fever infection of high incidence in cattle shipped to stockyards. The antibiotic material can also be used as a feed supplement, alone or in combination with other antibiotics or therapeutic materials, in promoting the growth of animals and poultry. Because of its high activity against *S. pullorum*, the antibiotic material is useful in the treatment of bacillary white diarrhea of chicks caused by this microorganism.

The following examples illustrate the production, recovery, concentration, purification and identification of antibiotic streptovaricin and components and derivatives thereof. These examples are merely illustrative in nature and they are not to be construed as limiting.

EXAMPLE 1.—PRODUCTION OF STREPTOVARICIN

A. *Inoculum.*—*Streptomyces spectabilis* was grown on a maltose-tryptone agar slant (composition in grams per liter of distilled water; maltose, 10; tryptone, 5; $K_2HPO_4$, 0.5; $FeSO_4 \cdot 7H_2O$, 0.1; agar, 15) for seven days at 28 degrees centigrade and the culture thus produced used as inoculum for producing a seed culture.

B. *Seed culture.*—Fifty milliliters of sterile medium of the following composition:

| | | |
|---|---|---|
| N-Z-amine A (enzymatic digest of casein) | grams | 2.0 |
| Glucose | do | 1.0 |
| Soy sauce (an extract of hydrolyzed soybean and wheat) | ml | 1.0 |
| $K_2HPO_4$ | grams | 0.25 |
| $KH_2PO_4$ | do | 0.25 |

Tap water to 100 mls.

was inoculated with an aqueous suspension of the culture or inoculum of *Streptomyces spectabilis* obtained from the maltose-tryptone agar above and the medium was incubated for forty hours at 28 degrees centigrade on a rotary shaker at 250 r.p.m.

C. *Fermentation.*—The seed culture obtained above was inoculated at a one percent concentration (v./v.) into 100 milliliters of a fermentation medium of the following composition:

| | Grams |
|---|---|
| Kay Soy (defatted, finely ground soybean meal) | 1 |
| Glucose | 2 |
| Brewer's yeast | 0.25 |
| KCl | 0.3 |
| $CaCO_3$ | 0.4 |

Tap water to 100 mls.

and the medium was incubated for five days on a rotary shaker at 28 degrees centigrade, and an aeration rate equivalent to a sulfite oxidation value of 0.3 millimole of oxygen/liter/minute. The filtrate showed activity against *M. pyogenes v. aureus, Bacillus subtilis, M. tuberculosis* H37Rv and saprophytic mycobacteria.

EXAMPLE 2.—PRODUCTION AND ISOLATION OF STREPTOVARICIN

A. *Preseed culture.*—100 milliliters of sterile preseed medium containing the following ingredients:

| | | |
|---|---|---|
| N-Z-amine A | grams | 20 |
| Glucose | do | 10 |
| Soy sauce | mls | 10 |
| $K_2HPO_4$ | grams | 2.5 |
| $KH_2PO_4$ | do | 1.5 |

Water (tap), q.s. (pH 6.8–7.0) 1 liter.

was inoculated with a culture of *Streptomyces spectabilis* obtained from an agar slant as in Example 1A and the medium was incubated for three days in shaken flasks at 28 degrees centigrade on a rotary shaker.

B. *Seed culture.*—A seed tank (five-gallon bottle sweep-stirrers) containing 12.5 liters of the following sterile medium:

| | | |
|---|---|---|
| Kay Soy | grams | 10 |
| Corn dextrin | do | 20 |
| Brewer's yeast | do | 2.5 |
| KCl | do | 3.0 |
| $CaCO_3$ | do | 4.0 |
| Corn steep liquor | mls | 10 |

Tap water, q.s. 1 liter.

was inoculated with one percent (v./v.) of the preseed culture obtained above and grown for ten days at 28 degrees centigrade.

C. *Fermentation.*—To each of two tanks containing 250 liters of the following medium:

| | | |
|---|---|---|
| Kay Soy | grams | 10 |
| Corn dextrin | do | 20 |
| Brewer's yeast | do | 2.5 |
| KCl | do | 3.0 |
| $CaCO_3$ | do | 4.0 |
| Corn steep liquor | mls | 10 |

Tap water, q.s. 1 liter.

| | | |
|---|---|---|
| Lard oil | mls./tank | 300 |
| Lard oil plus 1% Stenol (octadeconal) | do | 1550 | was added one-half the seed culture (b) and the medium then fermented at 28 degrees centigrade for 42 hours. The lard oil and lard oil plus 1% Stenol were added as required to prevent foaming.

D. *Isolation.*—After 42 hours, the whole beer was filtered at harvest pH of 7.4. The composite filtrate and mycelial wash (total volume of 600 liters) was saturated with ethyl acetate and extracted with 0.2 volume of ethyl acetate. The solvent extract (a volume of 121 liters) was concentrated to a volume of 960 milliliters and dried in vacuo. There was obtained 34 grams of a red glassy solid (57 percent yield). The material was purified in batches by a countercurrent distribution procedure (acetone-ethyl acetate-water, 1:1:1). On reprecipitation of the purified material from ethyl acetate-technical n-hexane, streptovaricin in crystalline form was obtained. This material possesses a potency of 1000 mcgs./mg. by the *Mycobacterium ranae* streptovaricin assay.

E. *Assays.*—The *Mycobacterium ranae* streptovaricin assay is made as follows:

*Mycobacterium ranae*, Upjohn culture collection No. 161, is grown on a Lowenstein-Jensen slant (K. A. Jensen, "Towards Standardization of Laboratory Methods," International Union Against Tuberculosis, vol. 24, pages 102–3, 1954). A small amount of growth on this slant is transferred to a 250-milliliter flask containing fifty milliliters of the following sterile medium:

| | | |
|---|---|---|
| Dextrose | grams | 10 |
| Beef extract (dried aqueous extract of beef) | do | 4 |
| Peptone | do | 4 |
| Yeast extract (dried aqueous extract of autolyzed yeast) | grams | 1 |
| Sodium chloride | do | 2.5 |
| Tween 80 (polyoxyethylene derivative of sorbitan monooleate) | mls | 10 |
| Distilled water to pH adjusted to 7.0 before autoclaving | mls | 1000 |

The inoculated broth is allowed to incubate for 24 hours at 37 degrees centigrade on a reciprocal shaker. One milliliter of bacterial suspension, standardized to about ten percent light transmission when read in a Lumetron colorimeter (Photovolt Corp.) at 530 m$\mu$ against a medium blank, is used to inoculate 100 milliliters of assay agar (brain-heart infusion broth containing, per liter: 200 grams infusion from calf brains, 250 grams infusion from beef heart, ten grams dextrose, five grams sodium chloride, 2.5 grams disodium phosphate, to which has been added 1.5 percent agar) cooled to and held at 48 degrees centigrade. Five milliliters of seeded agar is poured into heavy-bottom Petri dishes and allowed to solidify at room temperature before using.

Unknown solid preparations are dissolved in acetone at one mg./ml. and appropriate dilutions are made in M/10 phosphate buffer at pH 6. Beer and process liquor samples are also diluted to appropriate concentrations in buffer solutions. The assay is carried out using standard 12.7 millimeter filter paper discs to which is applied 0.08 milliliter of standard or test solutions (stock solution of a crystalline standard preparation contains one mg./ml. in acetone). Dilutions are made to five, ten, twenty, forty and eighty mcgs./ml. in M/10 phosphate buffer at pH 6.0. Plates are incubated at 37 degrees centigrade overnight and diameters of the zones of inhibition are measured. The standard curve is constructed on two-cycle semi-log paper with concentration in mcgs./ml. as the abscissa and zone size as the ordinate. The conversion factor is four micrograms per biological unit. A biological unit is defined as the amount of antibiotic which gives a twenty-millimeter zone of inhibition when tested against a sensitive organism such as *M. ranae, S. aureus,* or *B. subtilis,* using a 12.7-millimeter paper disc.

EXAMPLE 3.—PRODUCTION AND ISOLATION OF STREPTOVARICIN

A. *Preseed culture.*—Each of five 500-milliliter Erlenmeyer flasks containing 100 milliliters of the following preseed medium:

| | | |
|---|---|---|
| N-Z-amine A | grams | 20 |
| Glucose | do | 10 |
| Soy sauce | mls | 10 |
| $K_2HPO_4$ | grams | 2.5 |
| $KH_2PO_4$ | do | 1.5 |
| Tap water, q.s. to 1 liter. | | | was inoculated with a culture of *Streptomyces spectabilis* obtained from an agar slant as in Example 1A and the medium was incubated for three days at a temperature of 28 degrees centigrate on a rotary shaker.

B. *Seed culture.*—A tank containing 250 liters of the following medium:

| | | |
|---|---|---|
| Kay Soy | grams | 10 |
| Corn dextrin | do | 20 |
| Brewer's yeast | do | 2.5 |
| KCl | do | 3.0 |
| $CaCO_3$ | do | 4.0 |
| Corn steep liquor | mls | 10 |
| Water, q.s. to 1 liter. | | | was inoculated with the preseed culture obtained above and the medium incubated for two days at a temperature of 28 degrees centigrade with continuous stirring and aeration.

C. *Fermentation.*—After two days, the content of the seed tank was added to a 2000-gallon tank containing 5000 liters of the following sterile medium:

| | | |
|---|---|---|
| Corn dextrin | grams | 20 |
| Brewer's yeast | do | 2.5 |
| KCl | do | 3.0 |
| $CaCO_3$ | do | 4.0 |
| Corn steep liquor | mls | 10 |
| Peanut meal | grams | 10 |
| Water, q.s. to 1 liter. | | |
| Lard oil | gals./tank | 3 |
| Lard oil plus 1% Stenol | do | 12 |
| CLRS No. 10 (a mixture of free fatty acids plus mono-, di- and tri-glycerides and unsaponifiable matter) | gals./tank | 4 | and incubated at a temperature of 28 degrees centigrade for four days with continuous stirring and aeration. The lard oil, lard oil plus 1% Stenol, and CLRS were added as required to prevent foaming.

D. *Isolation.*—After four days, the fermented whole beer was filtered at a pH of 7.1 (natural pH), and the filtrate (1426 gallons) was extracted with 280 gallons (0.2 volume) ethyl acetate. The ethyl acetate extract was distilled under reduced pressure to a volume of 4200 milliliters. The concentrate was filtered, the filtrate treated with 8400 milliliters of technical n-hexane and filtered. The precipitate thus obtained was dissolved in 3920 milliliters of methylene chloride, treated with 3920 milliliters of technical n-hexane and the gummy red precipitate (Preparation 3A) removed by filtration. The filtrate was treated with three volumes of technical n-hexane and the yellow crystalline precipitate thus obtained was dried in vacuo. There was obtained 104 grams of streptovaricin (Preparation 3B) possessing a potency of ca. 920 mcgs./mg.

On adding thirty milliliters of a saturated aqueous solution of methyl orange to ten milliliters of an aqueous ethanol solution containing 0.5 gram of Preparation 3B and then maintaining the resulting solution at fifty degrees centigrade for thirty minutes, there is obtained the helianthate salt of streptovaricin in the form of brown crystals. The crystalline material is removed by filtration and dried.

The gummy red precipitate (Preparation 3A) was dissolved in 600 milliliters of acetone, accompanied by gentle warming and stirring. The solution was allowed to cool and stand at room temperature. After thirteen days, the solution had evaporated to a volume of about 500 milliliters. The yellow precipitate which had formed was removed by filtration, then washed with acetone and technical n-hexane and vacuum dried. There was obtained 71 grams of streptovaricin (Preparation 3C) possessing a potency of more than 2000 mcgs./mg.

On chromatographing this product (Preparation 3C) in a phosphate buffer system of a pH of 7.0 and a Bush B5 system, it was noted that components streptovaricin B, streptovaricin A and streptovaricin C were present.

EXAMPLE 4.—PREPARATION AND ISOLATION OF STREPTOVARICIN

The procedure of Examples 3A, B and C was followed on a 15,000-gallon tank scale using a medium having the following composition per liter:

| | Grams |
|---|---|
| Kay Soy | 20.0 |
| Corn dextrin | 40.0 |
| Brewer's yeast | 2.5 |
| KCl | 3.0 |
| $CaCO_3$ | 12.0 |

The temperature was held at 82 degrees Fahrenheit and the harvests were made at 84–88 hours. The beer from three tanks was filtered and extracted at pH 6.75–7.0 with 8,000 gallons of ethyl acetate. The extract was concentrated stepwise to nineteen gallons. The streptovaricin was precipitated by two volumes of technical n-hexane. The precipitate was dissolved in refluxing methylene chloride (except for about 200 grams of black tar which was discarded). The methylene chloride solution was mixed with one volume of technical n-hexane to give a solid which, upon drying, weighed 2665 grams and assayed 132 mcg./mg. streptovaricin B, 120 mcg./mg. streptovaricin A, and 141 mcg./mg. streptovaricin C by quantitative paper-grams (Preparation 4A). The supernatant was further treated with three volumes of technical n-hexane to give a solid weighing 1561 grams. It assayed 345 mcg./mg. streptovaricin B, 165 mcg./mg. streptovaricin A, and 665 mcg./mg. streptovaricin C (Preparation 4B). The supernatant was refiltered after standing to yield 178 grams of solids assaying 76 mcg./mg. streptovaricin B, 2 mcg./mg. streptovaricin A, 440 mcg./mg streptovaricin C, and 77 mcg./mg. streptovaricin D or streptovaricin E (Preparation 4C).

EXAMPLE 5.—PREPARATION AND ISOLATION OF STREPTOVARICIN

A. The beer from two further 15,000-gallon tanks prepared as in Example 4 was filtered and extracted at pH 4–5 with 4,800 gallons of methylene chloride. The medium used had the following composition per liter:

| | Grams |
|---|---|
| Soybean meal | 20 |
| Brewer's yeast | 2.5 |
| NaCl | 3.0 |
| $CaCO_3$ | 0.5 |
| Starch | 40.0 |

CLRS was not used. The fermentation was continued at 82 degrees Fahrenheit for the first 65 hours and then at 90 degrees Fahrenheit until the 112th hour when the tanks were harvested. The extract was distilled to a concentrate of ninety liters and was mixed with five volumes of technical n-hexane. The resulting precipitate was filtered and dried in vacuo. The yield was 22,157 grams (Preparation 5A) assaying by quantitative papergram assay 115 mcg./mg. streptovaricin B, 105 mcg./mg. streptovaricin A, 250 mcg./mg. streptovaricin C, and a significant amount of streptovaricin F.

B. The beer from two further 15,000-gallon tanks prepared as in Example 4, except that the temperature was held at 90 degrees Fahrenheit and the harvests were made at 114 hours, was filtered at pH 4–5 with 4800 gallons of methylene chloride. The extract was processed as in Example 5A to yield 29,036 grams of streptovaricin assaying 62.1 mcg./mg. streptovaricin B, 62.6 mcg./mg. streptovaricin A, 147.6 mcg./mg. streptovaricin C, and 105.1 mcg./mg. as streptovaricin E by quantitative papergram assay (Preparation 5B).

EXAMPLE 6.—PREPARATION AND ISOLATION OF STREPTOVARICIN

The beer from two further 15,000-gallon tanks prepared as in Example 4 was filtered and extracted at pH 4–5 with 4800 gallons of methylene chloride. The extract was distilled to a concentrate having a boiling point of sixty degrees centrigrade (one atmosphere) and sp. gr., 0.99. Investigation indicated that butyl acetate had contaminated the $CH_2Cl_2$. The concentration was ended when the boiling point under vacuum was seventy degrees centigrade. The final concentrate was mixed with 7.5 volume of technical n-hexane. The resulting precipitate weighted 4093 grams and assayed 725 mcg./mg. It was composed of 32.5 mcg./mg. streptovaricin B, 27.5 mcg./mg. streptovaricin A, 104.1 mcg./mg. streptovaricin C, and some streptovaricin D and/or streptovaricin E.

EXAMPLE 7.—PREPARATION OF STREPTOVARICIN

The beer from two further 15,000-gallon tanks prepared as in Example 4, except that the temperature was held at 90 degrees Fahrenheit throughout and the harvest was made at 136 hours, was filtered and extracted at pH 4–5 with 4800 gallons of methylene chloride. After the extract had been concentrated, a water layer separated and was removed from the concentrate. Th organic phase was concentrated further to ten gallons. The final concentrate was poured into five volumes of technical n-hexane. The resulting precipitate was collected and dried. It weighed 17,325 grams, assayed 174 mcg./mg. and contained 31 mcg./mg. streptovaricin B, 40 mcg./mg. streptovaricin A, and 142 mcg./mg. streptovaricin C, by quantitative papergrams.

EXAMPLE 8.—PREPARATION OF STREPTOVARICIN A

On dissolving the Preparation 3C above in a hot mixture of dioxane and benzene (3:1), there was obtained, on cooling, a filamentous, crystalline material. The crystalline product thus obtained was washed with a mixture of dioxane and benzene (3:1) and then dried in vacuo to obtain an orange-yellow crystalline material melting between 194 and 200 degrees centigrade and possessing an optical rotation $[\alpha]_D^{24} = +378$ degrees (0.25% in methanol); and exhibiting a peak in the ultraviolet absorption spectrum at 435 m$\mu$, $$E_{1\,cm.}^{1\%} = 115$$

The product thus obtained (Preparation 8A) possessed a potency of 3080 mcg./mg.

On chromatographing this product in a phosphate buffer system of pH 7.0, it was noted that streptovaricin A predominated.

When triturated with benzene, the orange-yellow crystals (Preparation 8A) were converted to another crystalline form having a length to breadth ratio of about 5 to about 10:1, possessing a chartreuse coloration under polarized light and melting between 195 and 200 degrees centigrade. This material, on drying, assumed the appearance of the original yellow crystals.

EXAMPLE 9.—PREPARATION AND CHARACTERIZATION OF STREPTOVARICIN A

*Crystallization of streptovaricin A.*—A solution was prepared by dissolving 11.3 kilograms of a line product prepared and isolated by the procedure of Examples 3A, B, C and D in 113 liters of 1,4-dioxane. Addition of an equal amount of technical hexane gave crude streptovaricin A crystals (724 grams). They were recrystallized from dioxane and benzene. The streptovaricin A crystals were dissolved in 7.25 liters of dioxane and precipitated by the addition of one volume of benzene. First crop yield was 362 grams (Preparation 9A). The dioxane-benzene mother liquors were concentrated to two liters. A second crop, 283 grams (Preparation 9B), was obtained by adding five volumes of technical n-hexane.

The first mother liquors (dioxane-technical n-hexane) were distilled to 38 gallons. Five gallons were used to prepare a solution nearly free of streptovaricin A by precipitating all of that component with ten volumes of technical hexane (Preparation 9C). The remaining 33 gallons were mixed with five volumes of technical hexane to precipitate 7860 grams of solids which assayed 167 mcg./mg. and was composed of 335 mcg./mg. streptovaricin B, 60 mcg./mg. streptovaricin A and 380 mcg./mg. streptovaricin C by quantitative papergrams (Preparation 9D).

*Recrystallization of streptovaricin A.*—Preparation 9A (362 grams) was recrystallized from benzene (20 liters) yielding four crops as follows:

| | Grams |
|---|---|
| 1st crop, Preparation 9E | 173 |
| 2nd crop, Preparation 9F | 62 |
| 3rd crop, Preparation 9H | 41 |
| 4th crop, Preparation 9I | 11 |

Preparation 9E ("benzene crystals") was then recrystallized from dioxane. If quickly cooled, long hair-like crystals come out. If these are allowed to stand in the mother liquor, or if the hot solution is cooled slowly, square plates are forced. The result is the same if peroxide-free dioxane is used. The square plates are dioxane solvated crystals containing 1½ moles of dioxane per mole of streptovaricin A (Preparation 9J).

*Characteristics.*—Upon drying in vacuum, the long filamentous crystals lost their shape. Masses which glow under crossed Nicol's prisms result. When suspended in benzene, or recrystallized from benzene, shorter, thicker needles are formed. When recrystallized from butyl acetate, clusters of needles form. Streptovaricin A is soluble in chloroform, methanol, dioxane; slightly soluble in benzene, acetone and water; and insoluble in the petroleum ethers. It does not take up $Br_2$ in $CCl_4$; when heated the solution becomes cherry red.

*Chemical Tests*

| Test | Result | Control | Conclusions |
|---|---|---|---|
| Benedict's | N | Glucose | No reducing sugar. |
| Ninhydrin | N | Glycylglycine | No amino acids. |
| Biuret | N | Bactopeptone | No peptide. |
| Molisch | N | Glucose | No carbohydrate. |
| Liebermann | N | | Non-steroidal. |
| Zimmerman | N | Acetone | No free ketones. |
| 2,4-dinitrophenyl-hydrazine | N | do | No free carbonyl groups. |
| Alcoholic $AgNO_3$ | N | | No $—C\equiv C—$. |
| Ferric chloride | P | Phenol | Phenol or enol. |
| Iodoform | P | | $>CH—C—O—$. |

NOTE.—N = negative and P = positive.

Analytical data—Preparation 9E:
Calcd. for $C_{34}H_{47-49}NO_{13}$: C, 60.2; H, 7.08; N, 2.07 (M.W. 678).
Found: C, 59.72; H, 6.57; N, 1.87; ash 0.0.
Active hydrogen, six moles of $CH_4$/mole.
Hydrogenation, Adams' catalyst, atmospheric pressure, 2.51, 2.57 moles $H_2$/mole.
Acyl, 18.17% or three

groups/molecule

Methoxyl, 4.92 percent or one $OCH_3$ group/molecule.
C-methyl, 23.65 percent or eleven $C—CH_3$ groups/molecule.
$[\alpha]_D^{24}$ +618 degrees ($CHCl_3$).

Saponification equivalent of Preparation A (unsolvated)—269.5.
Saponification equivalent of Preparation E (dioxane solvate)—226.3.
Molecular weight (calculated)—678.
Molecular weight of dioxane solvate—810.
Probable empirical formula—$C_{34}H_{47-49}NO_{13}$.
Melting point—195–200 degrees centigrade.

Figure 6:
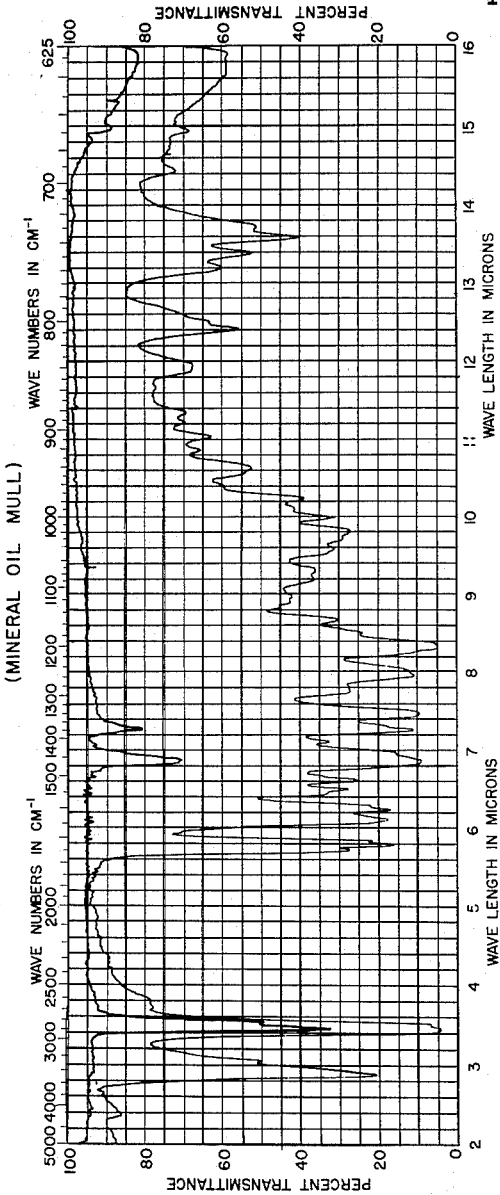

On recrystallization of Preparation 9E from acetone, crystals were obtained which had the infrared and ultraviolet absorption spectra shown in FIGURES 6 and 11, respectively.

The close relation between the components of 101a is shown by the following examples:

EXAMPLE 10.—CONVERSION OF STREPTOVARICIN A BY ACETYLATION

One gram streptovaricin A (Preparation 9F) was dissolved in twenty milliliters pyridine and refluxed for four hours with 3.3 milliliters acetic anhydride. The reaction mixture was refrigerated overnight and added to 200 milliliters cold water. One gram of a yellow precipitate was recrystallized to yield 564 milligrams bright yellow product (Preparation 10A) having the following characteristics:

$[\alpha]_D^{24}$:
 +153.7° (c., 0.3 in 95% EtOH)
 +124° (c., 1 in $CHCl_3$)
$a_{412}$ m$\mu$, 16.5
$a_{242}$ m$\mu$, 63.5 and the following analysis:

C ........................................ 60.02
H ........................................ 6.42
N ........................................ 1.63
Acyl ..................................... 30.09
Ash ...................................... 0.93

Papergram analysis showed the presence of component streptovaricin G in significant amount in Preparation 9F whereas papergram analysis showed the presence of components streptovaricin B, streptovaricin A, and strepovaricin G in Preparation 10A, and the presence of components streptovaricin B, strepovaricin A, streptovaricin C, streptovaricin D, streptovaricin E, and streptovaricin G in the filtrate.

EXAMPLE 11.—CONVERSION OF STREPTOVARICIN A BY p-TOLUENE SULFONATE AND GLACIAL ACETIC ACID

One gram streptovaricin A (Preparation 9F) was refluxed for 1½ hours with 100 milligrams sodium p-toluene sulfonate and twenty milliliters glacial acetic acid. The solution was raised to pH 3.3 and extracted twice with 30 milliliters methylene chloride. The methylene chloride solution was fractionated by adding 1, 5, 10, and 20 volumes technical n-hexane.

The resulting preparations showed only component streptovaricin B on papergram analysis. These preparations were pooled and subjected to a 230-tube countercurrent distribution using equal parts of cyclohexane, water ethyl acetate, and 95 percent ethanol. A single peak showing on papergram analysis only streptovaricin B was obtained. This indicates that conversion of streptovaricin A to streptovaricin B was accomplished.

EXAMPLE 12.—CONVERSION OF STREPTOVARICIN A BY AMMONIA

Five-tenths gram streptovaricin A (Preparation 9F) was dissolved in two milliliters 95 percent ethanol and stirred for 25 minutes with ten milliliters concentrated ammonium hydroxide. The pH was adjusted to 1.5 with concentrated sulfuric acid. On cooling to room temperature, a dark brown oil separated from a yellow aqueous phase. The oil was dissolved in eighty milliliters acetone and about 500 milligrams of greenish-white salt precipitated and was filtered. Water (210 mls.) was added to the filtrate and the resulting solution was freeze-dried. Papergram analysis shows the presence of all seven components of streptovaricin in the freeze-dried product.

EXAMPLE 13.—PARTITION CHROMATOGRAPHY OF STREPTOVARICIN

The solvent system used was prepared in the following manner.

For four liters of the mixture:

|  | Mls. |
| --- | --- |
| Toluene | 1333 |
| Technical n-hexane | 667 |
| Methanol | 1200 |
| Water | 800 |

These solvents were combined, mixed well, and allowed to separate into two phases. The phases were of approximately equal volume.

The column was prepared as follows: 250 grams of diatomaceous earth was stirred with 500 milliliters of six normal hydrochloric acid for one hour, collected by filtration and washed with distilled water until the pH of the washing was 5.5. It was then washed with methanol and air-dried. 180 grams of this acid-washed diatomaceous earth was mixed intimately with ninety milliliters of the lower phase of the solvent system described above and diatomaceus earth dry-packed with tamping into a Pyrex pipe one inch in diameter to a height of approximately 36 inches (90 cm.).

The sample fractionated was 1.0 gram of streptovaricin of Example 6. This was dissolved in ten milliliters of the lower phase of the system described above mixed with twenty grams of the acid-washed diatomaceous earth and the mixture dry-packed on top of the column.

The column was then eluted with the upper phase. Fractions were cut at twenty-minute intervals (20–25 milliliter volumes).

Fractions 1–25 contained streptovaricin D and streptovaricin E
Fractions 76–126 contained streptovaricin C
Fractions 148–193 contained streptovaricin B The band remaining on the column was scooped out and the streptovaricin A eluted from the diatomaceous earth with 300 milliliters of chloroform. This was evaporated to dryness to give 121 milligrams of streptovaricin A (Preparation 13A).

Fractions 1–25 were pooled and evaporated to dryness to give about 1105 milligrams of a mixture of streptovaricin D and streptovaricin E (Preparation 13B).

Fractions 76–126 were pooled and evaporated to dryness to give 385 milligrams of solid streptovaricin C (Preparation 13C).

Fractions 148–193 were pooled and evaporated to dryness to give 275 milligrams of solid streptovaricin B (Preparation 13D).

EXAMPLE 14.—SEPARATION OF COMPONENTS STREPTOVARICIN D AND STREPTOVARICIN E BY COUNTERCURRENT DISTRIBUTION

A. A mixture of streptovaricin D and streptovaricin E prepared according to Example 13 (Preparation 13B) was fractionated by the Craig countercurrent distribution technique. The system used was 95 percent ethanol-ethyl acetate-cyclohexane-water (1:1:1:1 by volume). One five-gram aliquot of the mixture was dissolved in 160 milliliters of the above solvent system and, after 195 transfers, two bands of color were evident. The first ($K=5.73$) did not fit the theoretical curve indicating at least two materials. This peak contained streptovaricin E and a black-amber impurity. The second ($K=2.04$) did fit the theoretical curve and was essentially pure streptovaricin D (Preperation 14A).

B. The above procedure was repeated with a second five-gram aliquot for 197 transfers and the peaks were pooled and evaporated to an aqueous slurry. The aqueous slurry was extracted with methylene chloride and the methylene chloride evaporated to dryness yielding 1.61 grams of biologically pure streptovaricin D (Preparation 14B).

C. The streptovaricin E fractions of A and B were pooled and the pool containing streptovaricin E and the impurity was evaporated to dryness, redissolved in 140 milliliters of the above solvent system and redistributed in the Craig machine. Using the recycling technique, 466 transfers were applied and again two hands of color were evident. The band containing streptovaricin E ($K=5.66$) was evaporated to an aqueous slurry and extracted with methylene chloride. Ten volumes of technical n-hexane was added and the solution filtered. The filtrate was evaporated to dryness and 1.22 grams of biologically pure streptovaricin E was obtained (Preparation 14C).

The following examples illustrate suitable formulations or dosage forms. The streptovaricin can be any of the preparations of Examples 3 through 7. Also the isolated components can be substituted for the streptovaricin in these examples.

EXAMPLE 15

10,000 oral tablets each containing 500 milligrams of streptovaricin are prepared from the following types and amounts of materials:

| | Grams |
|---|---|
| (1) Streptovaricin | 5000 |
| (2) Lactose | 1500 |
| (3) Corn starch | 250 |
| (4) Talc | 100 |
| (5) Magnesium stearate | 50 |

The finely powdered materials 1, 2, and 3 are mixed thoroughly, slugged, then granulated; the granules are mixed with 4 and 5 and tableted. The tablets are assayed for potency and used clinically.

EXAMPLE 16

10,000 oral tablets each containing 250 milligrams of streptovaricin are prepared from the following types and amounts of materials:

| | Grams |
|---|---|
| (1) Streptovaricin | 2500 |
| (2) Lactose | 1250 |
| (3) Corn starch | 750 |
| (4) Corn starch (as 10% paste) | 200 |
| (5) Calcium stearate | 50 |
| (6) Dried corn starch | 150 |
| (7) Talc | 100 |

The finely powdered materials 1, 2, and 3 are mixed, then granulated with 4; the dried granules are mixed with 5, 6, and 7 and tableted. The tablets are assayed for potency and used clinically.

EXAMPLE 17

Two-piece hard gelatin capsules for oral use, each containing 250 milligrams of streptovaricin and 125 milligrams of tetracycline hydrochloride, are prepared in the conventional manner by first mixing the finely powdered active materials with excipients (talc, corn starch, light mineral oil and magnesium stearate) and then capsulating. These capsules can be administered at the rate of eight to twelve capsules per day.

Compositions in which streptovaricin is the major proportion of the mixture are preferred. In general, about two to three parts by weight of streptovaricin should be present in these compositions for each part of a tetracycline antibiotic. A higher proportion of streptovaricin can be found useful in some cases. In each unit dose, the amount of streptovaricin can vary from about 35 milligrams to about one gram depending on the age, weight and condition of the animal or human patient. By "a tetracycline antibiotic" we wish to include tetracycline and oxytetracycline in the form of the amphoteric substance or any one or combinations of the avrious salts and derivatives which are active, such as the hydrochloride, metallic salt complexes, and metallic salts including the sodium or calcium salts.

EXAMPLE 18

Using the formula and procedure described in Example 17, except for the substitution of the tetracycline hydrochloride by isoniazid, capsules are prepared, each containing 250 milligrams of streptovaricin and thirty milligrams of isoniazed. Administration of eight to twelve capsules per day results in improved therapeutic effects including a reduction in the development of bacterial resistance. In general, about five to ten parts by weight of streptovaricin should be present in these compositions for each part of isoniazid. A higher proportion of streptovaricin is useful in some cases. By "isoniazid" is meant not only isoniazid itself, but also various salts such as the hydrochloride and derivatives such as the isopropyl substituted derivative and other alkyl derivatives of the compound.

EXAMPLE 19

Powder mixtures for oral use, containing in each gram of powder 600 milligrams of para-aminosalicylic acid and 150 milligrams of streptovaricin, are prepared in the conventional manner by first mixing the finely powdered active materials with excipients (magnesium trisilicate, corn starch, light mineral oil and calcium stearate). When this powder mixture is taken for the treatment of tuberculosis at the rate of twenty to thirty grams daily (in equally divided doses at mealtime and at bedtime), there results a reduction in the development of bacterial resistance and an improvement in therapeutic effect. In general, about four to six parts by weight of para-aminosalicylic acid should be present in these compositions for each part of streptovaricin. A higher proportion of para-aminosalicylic acid is useful in some cases. By "para-aminosalicylic acid" is meant not only para-aminosalicylic acid itself, but also various salts such as the sodium, potassium and calcium salts, and derivatives such as the chlorinated N-acetyl derivatives (Dutch Patent 74,340) and other acyl derivatives of the compound.

EXAMPLE 20

As in Example 19, powder mixtures for oral use, containing in each gram of powder 600 milligrams of para-aminosalicylic acid, 150 milligrams of streptovaricin and ten to twenty milligrams of isoniazid are prepared. The addition of isoniazid results in a further improvement in therapeutic effect and in reduction of bateral resistance when used in the treatment of tuberculosis in man or animals.

EXAMPLE 21

As in Example 19, except for the substitution of the tetracycline by novobiocin (also known as Albamycin or Cathomycin), capsules are prepared each containing 250 milligrams of streptovaricin and 125 milligrams of novobiocin sodium. Administration of eight to twelve capsules per day in the treatment of staphylococcal infections results in reduced bacterial resistance and in improved therapeutic effect.

Compositions in which streptovaricin is the major proportion of the mixture are preferred. In general, about two to three parts by weight of streptovaricin should be present in these compositions for each part of novobiocin. A higher proportion of streptovaricin can be found useful in some cases. In each unit dose, the amount of streptovaricin can vary from about 35 milligrams to about one gram depending on the age, weight and condition of the animal or human patient. By "novobiocin" is meant not only novobiocin itself, but also various salts and active derivatives such as the mono-sodium, di-sodium, mono-calcium, di-calcium, mono-magnesium, di-magnesium or other alkali metal or alkaline earth metal salts or amine salts of novobiocin and dihydronovobiocin.

EXAMPLE 22

A liquid suspension for oral use, containing in each cubic centimeter 100 milligrams of streptovaricin, is prepared from the following types and amounts of materials:

| | Grams |
|---|---|
| Soluble saccharin | 0.30 |
| Cyclamate sodium (N.N.R.) | 2.0 |
| Powdered sucrose | 25 |
| Streptovaricin | 10 |
| Benzoic acid powder | 0.10 |
| Methylparaben | 0.10 |
| Butylated hydroxyanisole | 0.01 |
| Orange flavor | 0.25 |
| Aluminum monostearate-peanut oil gel, q.s. 100 cc. | |

The aluminum monostearate-peanut oil gel is prepared by adding two grams of the stearate powder to 100 cc. of the oil with stirring and heating to 115 degrees centigrade until a clear gel forms and then cooling to room temperature. To a portion of this gel the preservatives and antioxidant are added with stirring. The antibiotic is then added followed by the sweetening and flavoring agents. When thoroughly mixed, additional gel is added to bring the suspension to 100 cc. The finished preparation is passed through a colloid mill, then assayed for potency and used clinically.

EXAMPLE 23

Using the formula and procedure described in Example 22 except for the addition of five grams of erythromycin, a liquid suspension for oral use is prepared containing in each cubic centimeter 100 milligrams of streptovaricin and fifty milligrams of erythromycin. Administration of this combination of antibiotics results in effective antibacterial therapy as well as in a reduction in the development of bacterial resistance. In general, about one to three parts by weight of streptovaricin should be present in these compositions for each part of erythromycin. A higher proportion of streptovaricin is useful in some cases. By "erythromycin" is meant not only erythromycin itself, but also various salts and esters such as the stearate, ethyl carbonate, lactate, maleate, glutarate, and the like.

EXAMPLE 24

A sterile aqueous preparation, suitable for intramuscular injection and containing in each cubic centimeter 500 milligrams of streptovaricin, is prepared from the following types and amounts of materials:

| | Grams |
|---|---|
| Polyethylene Glycol 4000, U.S.P. | 3.0 |
| Sodium chloride | 0.9 |
| Polysorbate 80, U.S.P. | 0.4 |
| Methylparaben, U.S.P. | 0.18 |
| Propylparaben, U.S.P. | 0.02 |
| Streptovaricin (micronized) | 50 |
| Water for injection, q.s. 100 cc. | |

All of the ingredients, with the exception of the antibiotic, are added to sufficient water for injection with stirring and moderate heat; after solution the vehicle is adjusted to pH 6 with suitable buffers and sterilized by filtration. The antibiotic is sterilized by exposure to ethylene oxide vapors and then incorporated into the previously sterilized vehicle. Sterile water for injection is added to bring volume to 100 cc. The final suspension is passed through a sterile colloid mill, bottled, assayed, and used clinically.

EXAMPLE 25

Using the formula and procedure described in Example 24 except for the addition of 52 grams of streptomycin sulfate, a sterile aqueous preparation suitable for intramusclar injection is prepared containing in each cubic centimeter 520 milligrams of streptomycin sulfate and 500 milligrams of streptovaricin. The streptomycin sulfate is dissolved in the vehicle after the pH is adjusted to about 6 as before and sterilized by filtration. Besides buffer, the addition of a stabilizer is important before adding the streptomycin. Suitable stabilizers include 0.5 to 1.5 percent of monothioglycerol, monothiosorbitol, monothioglucose, $\beta,\beta'$-thiodipropionic acid or one of its water-soluble esters, salts of sulfurous and hydrosulfurous acids and aldehyde addition products thereof such as sodium bisulfite, sodium formaldehyde sulfoxylate, potassium metabisulfite and sodium hydrosulfite. Advantageously a combination of organic and inorganic stabilizers is used such as about 0.2 to 0.7 percent of monothioglycerol with about 0.25 to 0.75 percent of sodium bisulfite. Administration of this combination of antibiotics is effective in the treatment of tuberculosis and shows a good reduction in the development of bacterial resistance. Half the streptomycin sulfate is advantageously replaced by an equivalent amount of dihydrostreptomycin sulfate.

The macroscopic and microscopic appearance of *Streptomyces spectabilis* on various media is unlike that of any culture described in Bergey's "Manual of Determinative Bacteriology," 6th edition, and Waksman and Lechevalier's "Actinomycetes and Their Antibiotics." Its tentative name is *Streptomyces spectabilis*.

*Streptomyces spectabilis* as originally isolated from soil exhibited the cultural characteristics cited in Table XI. All seeding was done with a vegetative inoculum grown in 100 milliliters of a tryptone-yeast extract broth (containing 0.5 percent tryptone and 0.3 percent yeast extract) on a reciprocating shaker at 28 degrees centigrade. After 48 hours, the inoculum was blended (Waring Blendor) for one minute and then 0.2 milliliter of the inoculum was added to each agar plate. The agar plates were incubated at 28 degrees centigrade. Readings were taken on the fourth and seventh days.

TABLE XI
*Culture Characteristics of* Streptomyces Spectabilis

| Medium | Vegetative Growth | Aerial Growth | Remarks |
|---|---|---|---|
| Casein starch [1] | Mottled-orange, to pale orange; deep orange sectors. | Trace of mottled orange to pale orange. | Mottled orange to orange reverse; hydrolysis +. |
| Czapek's sucrose agar.[2] | Mottled orange to cream-orange. | Mottled orange to orange. | Mottled orange to orange red reverse. |
| Maltose tryptone agar.[3] | Cream color with orange sectors to cream and orange; varying shades. | Orange; various shades. | Cream to orange-red reverse. |
| Bennett's agar [4] | Yellow turning orange red. | Trace of orange red to gray and orange. | Orange-yellow to orange-red reverse; yellow pigment. |
| Waksman's starch agar A.[5] | Cream color flecked with orange. | White flecked with orange to pale pink to orange. | Cream to orange reverse; hydrolysis +. |
| Waksman's starch agar B.[6] | Cream color flecked with orange. | Pale orange, deeper sectors especially on periphery; pale pink to orange. | Cream spotted red, to cream to orange reverse; hydrolysis +. |
| Nutrient starch agar.[7] | Cream turning orange. | Deep orange, paler sectors on periphery to pale pink to orange. | Yellow-orange to orange tan reverse; yellow pigment; hydrolysis +. |
| Peptone iron agar.[8] | Brown | None | Brown reverse; H₂S darkening. |

[1] Na caseinate 2.0, soluble starch 1.0, K₂HPO₄ 0.2, MgSO₄·7H₂O 0.2, FeSO₄·7H₂O trace, agar 15.0.
[2] NaNO₃ 2.0, K₂HPO₄ 1.0, MgSO₄·7H₂O 0.5, KCl 0.5, FeSO₄·7H₂O 0.01, sucrose 30.0, adjusted to a pH of 6.6, agar 15.0.
[3] Maltose 10.0, tryptone 5.0, K₂HPO₄ 0.5, NaCl 0.5, FeSO₄·7H₂O trace, agar 15.0. (Tryptone-pancreatic digest of casein of high tryptophane content.)
[4] Yeast extract 1.0, beef extract 1.0, N-Z amine A (enzymatic digest of casein) 2.0, glucose 10.0, medium adjusted to pH 7.0, agar 15.0.
[5] Corn starch 10.0, K₂HPO₄ 0.3, MgCO₃ 1.0, NaCl 0.5, NaNO₃ 1.0, medium adjusted to pH 7.0, agar 15.0.

(Footnotes Continued on Following Page)

The ingredients of the above media are in grams per liter of distilled water. The media are autoclaved for fifteen minutes at a pressure of fifteen pounds per square inch, 120 degrees centigrade.

*Streptomyces spectabilis* exhibits distinctive growth and morphological characteristics when grown on the following media. The ingredients of the media are in grams per liter of distilled water. Media are autoclaved for fifteen minutes at a pressure of fifteen pounds per square inch, 120 degrees centigrade.

Plain gelatin (gelatin 120)
Nutrient gelatin (beef extract 3.0, peptone 5.0, gelatin 120, adjusted to pH 7.0)
Nutrient agar (beef extract 3.0, peptone 5.0, adjusted to pH 7.0, agar 15.0)
Nutrient broth (beef extract 3.0, peptone 5.0)
d-Glucose broth (beef extract 3.0, peptone 5.0, glucose 10.0)
d-Glucose agar (beef extract 3.0, peptone 5.0, glucose 10.0, adjusted to pH 7.0, agar 15.0)
Tryptone broth (tryptone 10.0)
Waksman's tyrosine agar (glucose 10.0, tyrosine 1.0, $(NH_4)_2SO_4$ 0.5, $K_2HPO_4$ 0.5, pH adjusted to 7.0, agar 15.0)
Tyrosine broth (tyrosine 1.0, adjusted to pH 7.0)
Litmus milk (dehydrated milk with litmus dye added)
Nutrient nitrate broth (beef extract 3.0, peptone 5.0, $KNO_3$ 1.0)
Synthetic nitrate broth ($K_2HPO_4$ 0.5, NaCl 0.5, $MgSO_4 \cdot 7H_2O$ 0.2, $NaNO_3$ 2.0, glucose 10.0)
Calcium malate agar (calcium malate 10.0, $NH_4Cl$ 0.5, $K_2HPO_4$ 0.5, adjust medium to pH 7.0, agar 18.0)

Dilutions of the organism, made from a sterile soil stock, were streaked on Bennett's and maltose-tryptone agar plates. Four distinct variants were found (after 6 days' incubation at 28 degrees centigrade): one with characteristics of the parent, i.e., a variegated orange; one a very dark orange with no aerial growth; one with white aerial growth and one colorless—the same color as the medium. The same variants were obtained by plating out the variegated orange and the one with white aerial growth; dark orange and colorless variants by plating out the dark orange form. The colorless variants remained stable. Cultural characteristics of the variant with white aerial growth were the same as those for the variegated orange variant.

Cultural characteristics of the variants on various media after 14 days' incubation at 28 degrees centigrade are given in Table XII. Seeding was the same as for the culture described in Table XI.

TABLE XII

*Culture Characteristics of* Streptomyces Spectabilis *Variants*

| Medium | (5 strains) Variegated Orange | (2 strains) Dark Orange | (3 strains) Colorless |
|---|---|---|---|
| Plain gelatin | Liquefaction +. Dark brown pigment ½ depth of medium. | Liquefaction +. Dark brown pigment ½ depth of medium. | Liquefaction +. Slight yellow pigment. |
| Nutrient gelatin. | Liquefaction +. Dark brown pigment ½ depth of medium. | Liquefaction +. Dark brown pigment ½ depth of medium. | Liquefaction +. Slight yellow pigment. |

(Footnotes Continued from Table XI)

[6] Soluble starch 2.0, $K_2HPO_4$ 0.5, $MgSO_4 \cdot 7H_2O$ 0.2, $CaCl_2$ 0.05, $NaNO_3$ 0.05, asparagine 0.05, $FeSO_4 \cdot 7H_2O$ trace, medium adjusted to pH 7.4, agar 20.0.
[7] Beef extract 3.0, peptone (hydrolyzate of animal protein of low molecular weight) 5.0, soluble starch 2.0, medium adjusted to pH 7.0, agar 15.0.
[8] Peptone 15.0, proteose peptone (hydrolyzate of animal protein of high molecular weight) 5.0, ferric ammonium citrate 0.5, dipotassium phosphate 1.0, sodium thiosulfate 0.08, agar 15.0.

TABLE XII—Continued

| Medium | (5 strains) Variegated Orange | (2 strains) Dark Orange | (3 strains) Colorless |
|---|---|---|---|
| Nutrient nitrate broth. | No reduction for 4. Reduction for 1. | No reduction. | No reduction. |
| Synthetic nitrate broth. | Reduction for 4. No reduction for 1. | No reduction. | No reduction. |
| Tryptone broth. | No indole produced by 3. Indole produced by 2. | No indole produced. | No indole produced. |
| Casein starch agar. | Strong hydrolysis. Pink to orange aerial growth. Some sectoring. Orange reverse. | Strong hydrolysis. Bright orange vegetative and reverse. | Strong hydrolysis. Colorless vegetative and reverse. |
| Nutrient starch agar. | Strong hydrolysis. Pink to orange aerial growth with sectoring. Orange reverse. | Strong hydrolysis. Dark orange vegetative and reverse. | Strong hydrolysis. Colorless vegetative and reverse. |
| Skim milk agar. | Pink to orange to mottled orange aerial growth. Orange reverse. Brown pigment in 4. Slight hydrolysis. | Orange vegetative and reverse. Brown-tan pigment. No hydrolysis. | Colorless vegetative and reverse. Strong hydrolysis. |
| Peptone iron agar. | Pink to mottled orange aerial growth. Orange reverse. $H_2S$ darkening. | Dark vegetative with few colorless vegetative and reverse. $H_2S$ darkening. | Colorless vegetative and reverse. No $H_2S$ darkening. |
| Litmus milk. | pH 7.0. | pH 6.0. | pH 5.0. |
| Bennett's agar. | Mottled (compact to cottony) orange-pink-gray aerial growth. Orange reverse. Yellow pigment. | Hard, wrinkled red-orange vegetative. Red-orange reverse. Yellow pigment. | Trace gray-white aerial growth with feathery periphery. Dark tan pigment. |
| Maltose-tryptone agar. | Mottled, cottony orange aerial growth. Orange reverse. Brown pigment. | Dark orange vegetative with shades of green. Orange-brown reverse. Brown pigment. | Colorless vegetative. Trace gray aerial growth. Wrinkled on periphery. Cream reverse. |
| Czapek's Sucrose agar. | Mottled cottony to compact pink to peach aerial growth. Orange reverse. | Cherry pink to orange vegetative with colorless sectors. | Fair gray aerial growth. Cream to tan reverse. Slight tan pigment. |

The utilization of carbon compounds by variants of *Streptomyces spectabilis* in a synthetic medium is shown in Table XIII. The tubes were incubated at 28 degrees centigrade. Readings were taken on the seventh day. The procedure of Pridham and Gottlieb, J. Bact. 56, 107–114 (1948), was used with the following modifications:

(1) 500-milliliter Erlenmeyer flasks containing 100-milliliter sterile tryptone-yeast extract broth were inoculated from a soil stock of *Streptomyces spectabilis*. Flasks were incubated at 28 degrees centigrade on a reciprocal shaker.

(2) After 48 hours, the supernatant was decanted. The vegetative growth was washed with 100 milliliters of sterile, distilled water and the supernatant was again decanted. 100 milliliters of sterile distilled water were then added to the washed vegetative growth. The flask containing the mixture was placed on a reciprocal shaker and incubated at 28 degrees centigrade.

(3) After an additional 48 hours, the supernatant was decanted. The vegetative growth was washed as described above and blended (Waring Blendor) for one minute in 100 milliliters of sterile, distilled water.

(4) The agar slants were seeded with 0.2 milliliter of the blended inoculum.

TABLE XIII

*Assimilation of Carbon Compounds by Variants of Streptomyces spectabilis in the Synthetic Medium of Pridham and Gottlieb*

| Carbon Compound | Original Variegated Orange | Variants from Original Variegated Orange | Variants from Original Dark Orange | Variants from Original Colorless |
|---|---|---|---|---|
| Control | (−) | (−) | (−) | (−) |
| d-Xylose | (+) | (+) | (+) | (+) |
| l-Arabinose | (−) | (+) | + | + |
| Rhamnose | (−) | (−) | (−) | (−) |
| d-Fructose | + | + | + | + |
| d-Galactose | (+) | + | + | + |
| d-Glucose | (+) | + | + | + |
| d-Mannose | + | + | + | + |
| Maltose | + | + | + | + |
| Sucrose | (−) | (−) | (−) | (−) |
| Lactose | (−) | + | (−) | (−) |
| Cellobiose | + | + | + | + |
| Raffinose | + | + | + | + |
| Dextrin | (+) | + | + | + |
| Insulin | (−) | + | (−) | (−) |
| Soluble starch | (+) | + | + | + |
| Glycerol | (+) | + | + | + |
| Dulcitol | (−) | (−) | (−) | (−) |
| d-Mannitol | (+) | + | + | + |
| d-Sorbitol | (−) | (−) | (−) | (+) |
| Inositol | + | + | + | + |
| Salicin | (−) | (−) | (−) | (+) |
| Phenol | − | − | − | − |
| Cresol | − | − | − | − |
| Na formate | (−) | (−) | (−) | (−) |
| Na oxalate | (−) | (−) | (−) | (−) |
| Na tartrate | (−) | (+) | (−) | (+) |
| Na salicylate | − | − | − | − |
| Na acetate | (+) | (+) | (+) | (+) |
| Na citrate | (+) | (+) | (+) | (+) |
| Na succinate | (+) | (+) | (+) | (+) |

+ = positive assimilation; (+) = positive assimilation, slight growth; (−) = slight growth, no assimilation; − = no growth.

All variants grow at temperatures of 24 degrees–37 degrees centigrade, the optimum temperature being 24 degrees–28 degrees centigrade. At 37 degrees centigrade a strong yellow pigment is produced in Bennett's agar by all variants after 24–48 hours incubation.

Microscopic observations reveal very long straight chains of conidia arising monpodially from the aerial mycelium. Chlamydospores are found in the vegetative mycelium. These may be seen germinating in situ in Brown Fungus Culture Slides. An outstanding characteristic of this organism is the development of pigment granules in both the vegetative and aerial mycelium. In Brown Fungus Culture Slides these appear to be exogenous and endogenous in areas of fusing or anastomosing mycelium. The granules are colorless in the non-pigmented variants and orange-red in the colored variants.

In stained preparations and in wet mounts of unstained material where the mycelium is separated, the granules appear in more or less orderly rows. In stained preparations the mycelium containing the granules is opaque and measures 0.78–1.569μ± in diameter.

Solvent extracts of the pigment, from cultures on agar slants, have antibiotic activity. Similar antibiotic activity is exhibited by colorless and colored variants on agar streak plates.

It is to be understood that the invention is not to be limited to the exact details of operation or exact compounds shown and described, as obvious modifications and equivalents will be apparent to one skilled in the art, or the products to any particular process for their invention, and the invention is therefore to be limited only by the scope of the appended claims.

We claim:

1. A substance streptovaricin A characterized as follows:

Melting point: 195–200 degrees centigrade
   Analysis:                                      Percent
   C _____ 59.72
   H _____  6.57
   N _____  1.87
   Acyl _____ 18.17

Specific rotation $[\alpha]_D^{24}$ ($CHCl_3$): +618 degrees
   Molecular weight of its dioxane solvate: 810
   Infrared spectrum: as shown in FIGURE 6
   Ultraviolet spectrum: as shown in FIGURE 11
   Solubility in the pH range of 2–6:
   (1) Soluble in alkanols, lower-alkyl acetates, lower-alkyl ketones, chlorinated aliphatic hydrocarbons, and dioxane,
   (2) Slightly soluble in carbon tetrachloride, toluene, lower-alkyl ethers, and water.

2. A composition of matter consisting of the substance according to claim 1 in the crystalline state.

3. A substance streptovaricin B characterized as follows:

Melting point: 182–184 degrees centigrade
   Analysis:                                      Percent
   C _____ 58.84
   H _____  7.22
   N _____  1.87
   Acyl _____ 11.75

Figure 5:
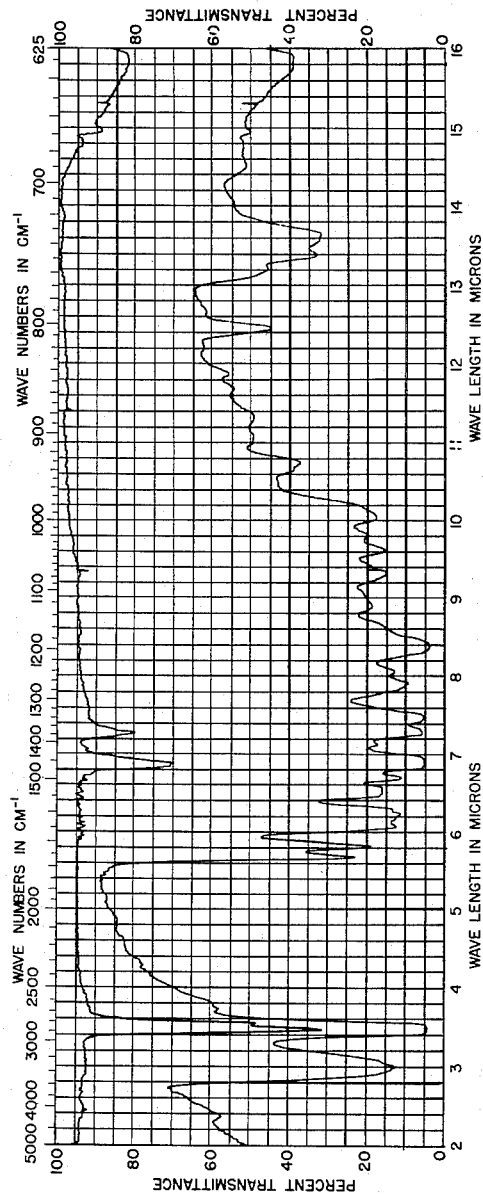

Specific rotation $[\alpha]_D^{24}$ ($CHCl_3$): +454 degrees
   Infrared spectrum: as shown in FIGURE 5
   Ultraviolet spectrum: as shown in FIGURE 10
   Solubility in the pH range of 2–6:
   (1) Soluble in alkanols, lower-alkyl acetates, lower-alkyl ketones, chlorinated aliphatic hydrocarbons, and dioxane,
   (2) Slightly soluble in carbon tetrachloride, toluene, lower-alkyl ethers, and water, said substance being so closely related chemically and physically to streptovaricin A as characterized in claim 1 that admixtures therewith are not resolved by paper chromatography using any of the solvent systems of Table II but are resolved by paper chromatography using the Bush B5 solvent system.

4. A composition of matter consisting of the substance according to claim 3 in the crystalline state.

5. A substance streptovaricin C characterized as follows:

Melting point: 168–171 degrees centigrade
   Analysis:                                      Percent
   C _____ 59.07
   H _____  6.99
   N _____  2.03
   Acyl _____  9.84

Specific rotation $[\alpha]_D^{24}$ ($CHCl_3$): +317 degrees
   Infrared spectrum: as shown in FIGURE 7
   Ultraviolet spectrum: as shown in FIGURE 12
   Solubility in the pH range of 2–6:
   (1) Soluble in alkanols, lower-alkyl acetates, lower-alkyl ketones, chlorinated aliphatic hydrocarbons, and dioxane,
   (2) Slightly soluble in carbon tetrachloride, toluene, lower-alkyl ethers, and water, said substance being so closely related chemically and physically to streptovaricin A as characterized in claim 1 that admixtures therewith are not resolved by paper chromatography using any of the solvent systems of Table II but are resolved by paper chromatography using the Bush B5 solvent system.

6. A composition of matter consisting of the substance according to claim 5 in the crystalline state.

7. A substance streptovaricin D characterized as follows:

Melting point: 115–118 degrees centigrade
   Analysis:                                      Percent
   C _____ 60.86
   H _____  7.85
   N _____  2.14
   Acyl _____  5.91

Specific rotation $[\alpha]_D^{24}$ ($CHCl_3$): +102 degrees
   Infrared spectrum: as shown in FIGURE 8
   Ultraviolet spectrum: as shown in FIGURE 13

Solubility in the pH range of 2–6:
(1) Soluble in alkanols, lower-alkyl acetates, lower-alkyl ketones, chlorinated aliphatic hydrocarbons, and dioxane,
(2) Slightly soluble in carbon tetrachloride, toluene, lower-alkyl ethers, and water, said substance being so closely related chemically and physically to streptovaricin A as characterized in claim 1 that admixtures therewith are not resolved by paper chromatography using any of the solvent systems of Table II but are resolved by paper chromatography using the Bush B5 solvent system.

8. A composition of matter consisting of the substance according to claim 7 in the crystalline state.

9. A substance streptovaricin E characterized as follows:

Melting point: 102–105 degrees centigrade

| Analysis: | Percent |
|---|---|
| C | 63.11 |
| H | 7.16 |
| N | 1.92 |
| Acyl | 6.13 |

Specific rotation $[\alpha]_D^{24}$ (CHCl$_3$): +613 degrees
Infrared spectrum: as shown in FIGURE 9
Ultraviolet spectrum: as shown in FIGURE 14
Solubility in the pH range of 2–6:
(1) Soluble in alkanols, lower-alkyl acetates, lower-alkyl ketones, chlorinated aliphatic hydrocarbons, and dioxane,
(2) Slightly soluble in carbon tetrachloride, toluene, lower-alkyl ethers, and water, said substance being so closely related chemically and physically to streptovaricin A as characterized in claim 1 that admixtures therewith are not resolved by paper chromatography using any of the solvent systems of Table II but are resolved by paper chromatography using the Bush B5 solvent system.

10. A composition of matter consisting of the substance according to claim 9 in the crystalline state.

11. A compound selected from the group consisting of streptovaricin A as charaterized in claim 1, streptovaricin B as characterized in claim 3, streptovaricin C as characterized in claim 5, streptovaricin D as characterized in claim 7, and streptovaricin E as characterized in claim 9.

12. A compound as characterized in claim 11, in the crystalline state.

13. A therapeutic composition containing as an essential antibacterial agent a compound as characterized in claim 11, and a pharmaceutical carrier.

14. A composition of matter consisting essentially of streptovaricin A as characterized in claim 1, streptovaricin B as characterized in claim 3, and streptovaricin C as characterized in claim 5.

15. A composition of matter, according to claim 14, in the crystalline state.

16. A process which comprises cultivating *Streptomyces spectabilis*, in an aqueous nutrient medium under aerobic conditions until substantial antibiotic activity is imparted to said medium by production of a compound as characterized in claim 11.

17. A process for producing an antibiotic, which comprises cultivating *Streptomyces spectabilis* in an aqueous nutrient medium under aerobic conditions until substantial antibacterial activity is imparted to said medium by production of a compound as characterized in claim 11.

18. A process which comprises cultivating under aerobic conditions *Streptomyces spectabilis* in an aqueous nutrient medium containing assimilable carbohydrate and proteinaceous materials, until substantial antibiotic activity is imparted to said medium by production of a compound characterized in claim 11 and then recovering the antibiotic activity therefrom.

19. The process of claim 18 wherein the aqueous nutrient medium is maintained at a temperature between about 24 and about 37 degrees centigrade for a period between about two and about six days.

20. The process of claim 18 wherein the antibiotic activity is recovered by extracting the fermented aqueous nutrient medium with a water-immiscible organic solvent and the antibiotic activity is isolated from the solvent extract.

21. The process of claim 18 wherein the antibiotic activity is recovered by extracting the fermented aqueous nutrient medium with a water-immiscible organic solvent selected from the group consisting of lower-alkyl acetates, lower-aliphatic ketones, halogenated aliphatic hydrocarbons, benzene, toluene, cyclohexane and methyl cyclohexane and the antibiotic activity is isolated from the solvent extract.

22. The process of claim 18 wherein the antibiotic activity is recovered by extracting the fermented aqueous nutrient medium with ethyl acetate and the antibiotic activity is isolated from the solvent extract.

23. The process of claim 18 wherein the antibiotic activity is recovered by extracting the fermented aqueous nutrient medium with methylene chloride and the antibiotic activity is isolated from the solvent extract.

References Cited in the file of this patent

UNITED STATES PATENTS

| 2,628,931 | Nunheimer | Feb. 17, 1953 |
| 2,644,782 | Harned et al. | July 7, 1953 |
| 2,644,783 | Weidenheimer et al. | July 7, 1953 |
| 2,709,672 | Petty | May 31, 1955 |
| 2,996,503 | Sprague et al. | Aug. 15, 1961 |

OTHER REFERENCES

Siminoff et al.: Amer. Rev. T.B., April 1957, pp. 576–593.

Pridham et al.: Applied Microbiology, January 1958, pp. 52–79.